(12) United States Patent
Gieseke et al.

(10) Patent No.: US 12,403,894 B2
(45) Date of Patent: Sep. 2, 2025

(54) VEHICULAR AUTOMATED PARKING SYSTEM

(71) Applicant: MAGNA ELECTRONICS INC., Auburn Hills, MI (US)

(72) Inventors: Achim Gieseke, Gross-Umstadt (DE); Frank Goseberg, Aschaffenburg (DE); Michael Biemer, Aschaffenburg-Obernau (DE); Ruediger Boegel, Grossostheim (DE); Goerg Pflug, Weil der Stadt (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 645 days.

(21) Appl. No.: 17/661,573

(22) Filed: May 2, 2022

(65) Prior Publication Data
US 2022/0250610 A1    Aug. 11, 2022

Related U.S. Application Data

(60) Continuation of application No. 16/449,529, filed on Jun. 24, 2019, now Pat. No. 11,318,928, which is a
(Continued)

(51) Int. Cl.
*B60W 30/00* (2006.01)
*B60R 1/27* (2022.01)
(Continued)

(52) U.S. Cl.
CPC ............... *B60W 30/00* (2013.01); *B60R 1/27* (2022.01); *B60W 30/06* (2013.01);
(Continued)

(58) Field of Classification Search
None
See application file for complete search history.

(56) References Cited

U.S. PATENT DOCUMENTS

| 5,355,118 A | 10/1994 | Fukuhara |
|---|---|---|
| 5,416,478 A | 5/1995 | Morinaga |

(Continued)

FOREIGN PATENT DOCUMENTS

| DE | 3248511 A1 | 7/1984 |
|---|---|---|
| DE | 102008049113 A1 | 5/2009 |

(Continued)

*Primary Examiner* — Imran K Mustafa
(74) *Attorney, Agent, or Firm* — HONIGMAN LLP

(57) ABSTRACT

A vehicular automated parking system includes a plurality of cameras viewing exterior of the vehicle. While the vehicle is traveling along the road, the vehicular automated parking system operates in a parking space locating mode to determine available parking spaces at least in part via processing, at an electronic control unit having an image processor, of image data captured by at least one camera of the plurality of cameras. The vehicular automated parking system fuses the determined available parking spaces with map data to generate an annotated map for display at the video display screen for viewing by the driver of the vehicle to assist the driver in selecting a parking space from the determined available parking spaces. After selection of the parking space, the vehicular automated parking system parks the equipped vehicle in the selected parking space.

7 Claims, 29 Drawing Sheets

Related U.S. Application Data division of application No. 14/726,906, filed on Jun. 1, 2015, now Pat. No. 10,328,932.

(60) Provisional application No. 62/088,128, filed on Dec. 5, 2014, provisional application No. 62/075,349, filed on Nov. 5, 2014, provisional application No. 62/067,113, filed on Oct. 22, 2014, provisional application No. 62/027,462, filed on Jul. 22, 2014, provisional application No. 62/006,391, filed on Jun. 2, 2014.

(51) Int. Cl.
*B60W 30/06* (2006.01)
*B60W 30/095* (2012.01)
*B60W 50/00* (2006.01)
*B60W 50/14* (2020.01)
*B62D 15/02* (2006.01)

(52) U.S. Cl.
CPC ...... *B60W 30/095* (2013.01); *B60W 50/0097* (2013.01); *B62D 15/028* (2013.01); *B60R 2300/806* (2013.01); *B60W 2050/146* (2013.01); *B60W 2555/00* (2020.02)

(56) References Cited

U.S. PATENT DOCUMENTS

| | | |
|---|---|---|
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,670,935 A | 9/1997 | Schofield et al. |
| 5,724,316 A | 3/1998 | Brunts |
| 5,737,226 A | 4/1998 | Olson et al. |
| 5,760,826 A | 6/1998 | Nayar |
| 5,760,828 A | 6/1998 | Cortes |
| 5,760,931 A | 6/1998 | Saburi et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,914,815 A | 6/1999 | Bos |
| 5,923,027 A | 7/1999 | Stam et al. |
| 5,929,786 A | 7/1999 | Schofield et al. |
| 5,940,120 A | 8/1999 | Frankhouse et al. |
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,971,552 A | 10/1999 | O'Farrell et al. |
| 5,986,796 A | 11/1999 | Miles |
| 5,990,469 A | 11/1999 | Bechtel et al. |
| 5,990,649 A | 11/1999 | Nagao et al. |
| 6,001,486 A | 12/1999 | Varaprasad et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,087,953 A | 7/2000 | DeLine et al. |
| 6,097,024 A | 8/2000 | Stam et al. |
| 6,116,743 A | 9/2000 | Hoek |
| 6,124,647 A | 9/2000 | Marcus et al. |
| 6,124,886 A | 9/2000 | DeLine et al. |
| 6,139,172 A | 10/2000 | Bos et al. |
| 6,144,022 A | 11/2000 | Tenenbaum et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,201,642 B1 | 3/2001 | Bos |
| 6,222,460 B1 | 4/2001 | DeLine et al. |
| 6,243,003 B1 | 6/2001 | DeLine et al. |
| 6,250,148 B1 | 6/2001 | Lynam |
| 6,259,412 B1 | 7/2001 | Duroux |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,291,906 B1 | 9/2001 | Marcus et al. |
| 6,294,989 B1 | 9/2001 | Schofield et al. |
| 6,297,781 B1 | 10/2001 | Turnbull et al. |
| 6,310,611 B1 | 10/2001 | Caldwell |
| 6,313,454 B1 | 11/2001 | Bos et al. |
| 6,317,057 B1 | 11/2001 | Lee |
| 6,320,282 B1 | 11/2001 | Caldwell |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,523 B2 | 1/2002 | Lynam |
| 6,353,392 B1 | 3/2002 | Schofield et al. |
| 6,366,213 B2 | 4/2002 | DeLine et al. |
| 6,370,329 B1 | 4/2002 | Teuchert |
| 6,396,397 B1 | 5/2002 | Bos et al. |
| 6,411,204 B1 | 6/2002 | Bloomfield et al. |
| 6,411,328 B1 | 6/2002 | Franke et al. |
| 6,420,975 B1 | 7/2002 | DeLine et al. |
| 6,424,273 B1 | 7/2002 | Gutta et al. |
| 6,428,172 B1 | 8/2002 | Hutzel et al. |
| 6,430,303 B1 | 8/2002 | Naoi et al. |
| 6,433,676 B2 | 8/2002 | DeLine et al. |
| 6,442,465 B2 | 8/2002 | Breed et al. |
| 6,476,730 B2 | 11/2002 | Kakinami et al. |
| 6,477,464 B2 | 11/2002 | McCarthy et al. |
| 6,483,429 B1 | 11/2002 | Yasui et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,513,252 B1 | 2/2003 | Schierbeek et al. |

(56) References Cited

U.S. PATENT DOCUMENTS

| | | |
|---|---|---|
| 6,516,664 B2 | 2/2003 | Lynam |
| 6,534,884 B2 | 3/2003 | Marcus et al. |
| 6,539,306 B2 | 3/2003 | Turnbull |
| 6,547,133 B1 | 4/2003 | Devries, Jr. et al. |
| 6,553,130 B1 | 4/2003 | Lemelson et al. |
| 6,574,033 B1 | 6/2003 | Chui et al. |
| 6,589,625 B1 | 7/2003 | Kothari et al. |
| 6,593,565 B2 | 7/2003 | Heslin et al. |
| 6,594,583 B2 | 7/2003 | Ogura et al. |
| 6,611,610 B1 | 8/2003 | Stam et al. |
| 6,627,918 B2 | 9/2003 | Getz et al. |
| 6,636,258 B2 | 10/2003 | Strumolo |
| 6,648,477 B2 | 11/2003 | Hutzel et al. |
| 6,650,233 B2 | 11/2003 | DeLine et al. |
| 6,650,455 B2 | 11/2003 | Miles |
| 6,672,731 B2 | 1/2004 | Schnell et al. |
| 6,674,562 B1 | 1/2004 | Miles |
| 6,678,056 B2 | 1/2004 | Downs |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjonell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,806,452 B2 | 10/2004 | Bos et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,825,880 B2 | 11/2004 | Asahi et al. |
| 6,847,487 B2 | 1/2005 | Burgner |
| 6,882,287 B2 | 4/2005 | Schofield |
| 6,889,161 B2 | 5/2005 | Winner et al. |
| 6,898,495 B2 | 5/2005 | Tanaka et al. |
| 6,909,753 B2 | 6/2005 | Meehan et al. |
| 6,940,423 B2 | 9/2005 | Takagi et al. |
| 6,946,978 B2 | 9/2005 | Schofield |
| 6,947,064 B1 | 9/2005 | Hahn et al. |
| 6,968,736 B2 | 11/2005 | Lynam |
| 6,975,775 B2 | 12/2005 | Rykowski et al. |
| 7,004,593 B2 | 2/2006 | Weller et al. |
| 7,004,606 B2 | 2/2006 | Schofield |
| 7,005,974 B2 | 2/2006 | McMahon et al. |
| 7,038,577 B2 * | 5/2006 | Pawlicki ............ B60W 30/143 340/436 |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,116,246 B2 | 10/2006 | Winter et al. |
| 7,123,168 B2 | 10/2006 | Schofield |
| 7,149,613 B2 | 12/2006 | Stam et al. |
| 7,167,796 B2 | 1/2007 | Taylor et al. |
| 7,202,776 B2 | 4/2007 | Breed |
| 7,227,459 B2 | 6/2007 | Bos et al. |
| 7,227,611 B2 | 6/2007 | Hull et al. |
| 7,257,486 B2 | 8/2007 | Shimazaki et al. |
| 7,295,227 B1 | 11/2007 | Asahi et al. |
| 7,366,595 B1 | 4/2008 | Shimizu et al. |
| 7,369,940 B2 | 5/2008 | Frank et al. |
| 7,526,103 B2 | 4/2009 | Schofield et al. |
| 7,598,887 B2 | 10/2009 | Sato et al. |
| 7,616,781 B2 | 11/2009 | Schofield et al. |
| 7,619,508 B2 | 11/2009 | Lynam et al. |
| 7,639,149 B2 | 12/2009 | Katoh |
| 7,680,570 B2 | 3/2010 | Mori |
| 7,720,580 B2 | 5/2010 | Higgins-Luthman |
| 7,914,187 B2 | 3/2011 | Higgins-Luthman et al. |
| 8,285,479 B2 | 10/2012 | Kawabata et al. |
| 8,451,107 B2 | 5/2013 | Lu et al. |
| 8,874,317 B2 | 10/2014 | Marczok et al. |
| 10,328,932 B2 | 6/2019 | Gieseke et al. |
| 11,318,928 B2 | 5/2022 | Gieseke et al. |
| 2002/0113873 A1 | 8/2002 | Williams |
| 2003/0080877 A1 | 5/2003 | Takagi et al. |
| 2003/0137586 A1 | 7/2003 | Lewellen |
| 2003/0222982 A1 | 12/2003 | Hamdan et al. |
| 2004/0130464 A1 | 7/2004 | Schindler et al. |
| 2004/0153243 A1 | 8/2004 | Shimazaki et al. |
| 2005/0285758 A1 | 12/2005 | Matsukawa et al. |
| 2006/0050018 A1 | 3/2006 | Hutzel et al. |
| 2006/0091813 A1 | 5/2006 | Stam et al. |
| 2006/0103727 A1 | 5/2006 | Tseng |
| 2006/0164230 A1 | 7/2006 | DeWind et al. |
| 2006/0250501 A1 | 11/2006 | Wildmann et al. |
| 2006/0287825 A1 | 12/2006 | Shimizu et al. |
| 2006/0287826 A1 | 12/2006 | Shimizu et al. |
| 2007/0021881 A1 | 1/2007 | Mori |
| 2007/0104476 A1 | 5/2007 | Yasutomi et al. |
| 2008/0009990 A1 * | 1/2008 | Katoh ............ B62D 15/0285 340/436 |
| 2009/0113509 A1 | 4/2009 | Tseng et al. |
| 2009/0121899 A1 | 5/2009 | Kakinami et al. |
| 2009/0243888 A1 | 10/2009 | Kawabata et al. |
| 2010/0013670 A1 | 1/2010 | Hueppauff et al. |
| 2010/0045797 A1 | 2/2010 | Schofield et al. |
| 2010/0117812 A1 | 5/2010 | Laubinger et al. |
| 2010/0235053 A1 | 9/2010 | Iwakiri et al. |
| 2010/0286872 A1 | 11/2010 | Endo et al. |
| 2010/0329510 A1 | 12/2010 | Schmid |
| 2011/0054739 A1 | 3/2011 | Bammert et al. |
| 2011/0074957 A1 | 3/2011 | Kiyohara et al. |
| 2011/0156928 A1 | 6/2011 | Ghisio et al. |
| 2012/0173080 A1 | 7/2012 | Cluff |
| 2013/0046441 A1 | 2/2013 | Marczok et al. |
| 2013/0116859 A1 | 5/2013 | Ihlenburg et al. |
| 2013/0184925 A1 | 7/2013 | Niemz et al. |
| 2014/0067187 A1 | 3/2014 | Ferguson et al. |
| 2014/0067206 A1 | 3/2014 | Pflug |
| 2014/0195114 A1 * | 7/2014 | Tseng ............... B60G 17/015 701/1 |
| 2014/0240502 A1 * | 8/2014 | Strauss ............. B62D 15/0285 348/148 |
| 2014/0266802 A1 | 9/2014 | Love |
| 2014/0310595 A1 | 10/2014 | Acharya et al. |
| 2014/0347195 A1 * | 11/2014 | Stempnik ............... G08G 1/168 340/932.2 |
| 2014/0354628 A1 | 12/2014 | Lindberg et al. |
| 2014/0354811 A1 | 12/2014 | Weber |
| 2014/0375476 A1 | 12/2014 | Johnson et al. |
| 2015/0022664 A1 | 1/2015 | Pflug et al. |
| 2015/0042808 A1 | 2/2015 | Pflug |
| 2015/0081174 A1 | 3/2015 | Marczok et al. |
| 2015/0124096 A1 | 5/2015 | Koravadi |
| 2015/0158499 A1 | 6/2015 | Koravadi |
| 2015/0251599 A1 | 9/2015 | Koravadi |
| 2016/0096477 A1 | 4/2016 | Biemer |

FOREIGN PATENT DOCUMENTS

| | | |
|---|---|---|
| EP | 0513476 A1 | 11/1992 |
| EP | 1065642 A2 | 1/2001 |
| EP | 1308346 A2 | 5/2003 |
| EP | 1510442 A2 | 3/2005 |
| EP | 1950097 A1 | 7/2008 |
| EP | 2055536 A1 | 5/2009 |
| FR | 2585991 A3 | 2/1987 |
| FR | 2672857 A1 | 8/1992 |
| FR | 2673499 A1 | 9/1992 |
| GB | 934037 A | 8/1963 |
| GB | 2137573 A | 10/1984 |
| GB | 2244187 A | 11/1991 |
| GB | 2255539 A | 11/1992 |

(56) References Cited

FOREIGN PATENT DOCUMENTS

| | | |
|---|---|---|
| JP | S5539843 A | 3/1980 |
| JP | S58110334 A | 6/1983 |
| JP | 58209635 | 12/1983 |
| JP | 59114139 | 7/1984 |
| JP | 5913336 B2 | 9/1984 |
| JP | 6080953 | 5/1985 |
| JP | 60261275 | 11/1985 |
| JP | 6079889 | 10/1986 |
| JP | 6272245 | 5/1987 |
| JP | 62122487 | 6/1987 |
| JP | 62122844 | 6/1987 |
| JP | 6414700 | 1/1989 |
| JP | 01123587 | 5/1989 |
| JP | 30-061192 | 3/1991 |
| JP | 4114587 B2 | 4/1992 |
| JP | 40245886 | 9/1992 |
| JP | 50000638 | 1/1993 |
| JP | 0550883 | 3/1993 |
| JP | 0577657 | 3/1993 |
| JP | 5213113 | 8/1993 |
| JP | 06227318 | 8/1994 |
| JP | 074170 | 1/1995 |
| JP | 07105496 | 4/1995 |
| JP | 2630604 | 7/1997 |
| WO | 199621581 | 7/1996 |
| WO | 2007012516 A1 | 2/2007 |
| WO | 2008055567 A1 | 5/2008 |
| WO | 2014204794 A1 | 12/2014 |

* cited by examiner

VEHICULAR AUTOMATED PARKING SYSTEM

CROSS REFERENCE TO RELATED APPLICATIONS

The present application is a continuation of U.S. patent application Ser. No. 16/449,529, filed Jun. 24, 2019, now U.S. Pat. No. 11,318,928, which is a division of U.S. patent application Ser. No. 14/726,906, filed Jun. 1, 2015, now U.S. Pat. No. 10,328,932, which claims the filing benefits of U.S. provisional applications, Ser. No. 62/088,128, filed Dec. 5, 2014; Ser. No. 62/075,349, filed Nov. 5, 2014, Ser. No. 62/067,113, filed Oct. 22, 2014, Ser. No. 62/027,462, filed Jul. 22, 2014, and Ser. No. 62/006,391, filed Jun. 2, 2014, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vehicle sensor processing system or vision system or imaging system for a vehicle that utilizes one or more cameras (preferably one or more CMOS cameras) or other sensors to capture environmental data representative of the environment exterior of the vehicle, and provides an environmental scene's map that may be utilized in autonomous vehicle control and/or during a parking maneuver and/or a pulling out or park-out maneuver. The system processes and fuses the sensors' data via an advanced classification algorithm and neural knitting. The system may utilize vehicle inherent sensor data as well as transmitted remote sensor data, such as only rear camera data or the system may utilize any additional camera, such as cameras of a surround view vision system. The system may determine an appropriate parking space, such as via image processing of image data captured by at least one camera of the vehicle, and may determine a parking space along a curve in a road. The system may fuse captured data with map data to generate an annotated map for display to the driver to assist the driver in finding and parking at a parking space.

These and other objects, advantages, purposes and features of the present invention will become apparent upon review of the following specification in conjunction with the drawings.

LEGEND

| | |
|---|---|
| 20 | vehicle parking in front of a potential parking gap. |
| 21 | vehicle parking in behind of a potential parking gap. |
| 22 | a potential parking gap. |
| 23 | angle in between the vehicles parking in front and in behind of a potential parking gap. |
| 24 | space projection into behind vehicle parking in front of a potential parking gap. |
| 25 | space projection into front of vehicle parking in behind of a potential parking gap. |
| 30 | sidewalk space. |
| 31 | road space. |

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction or such as to assist the driver in driving collision avoidance in a forward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
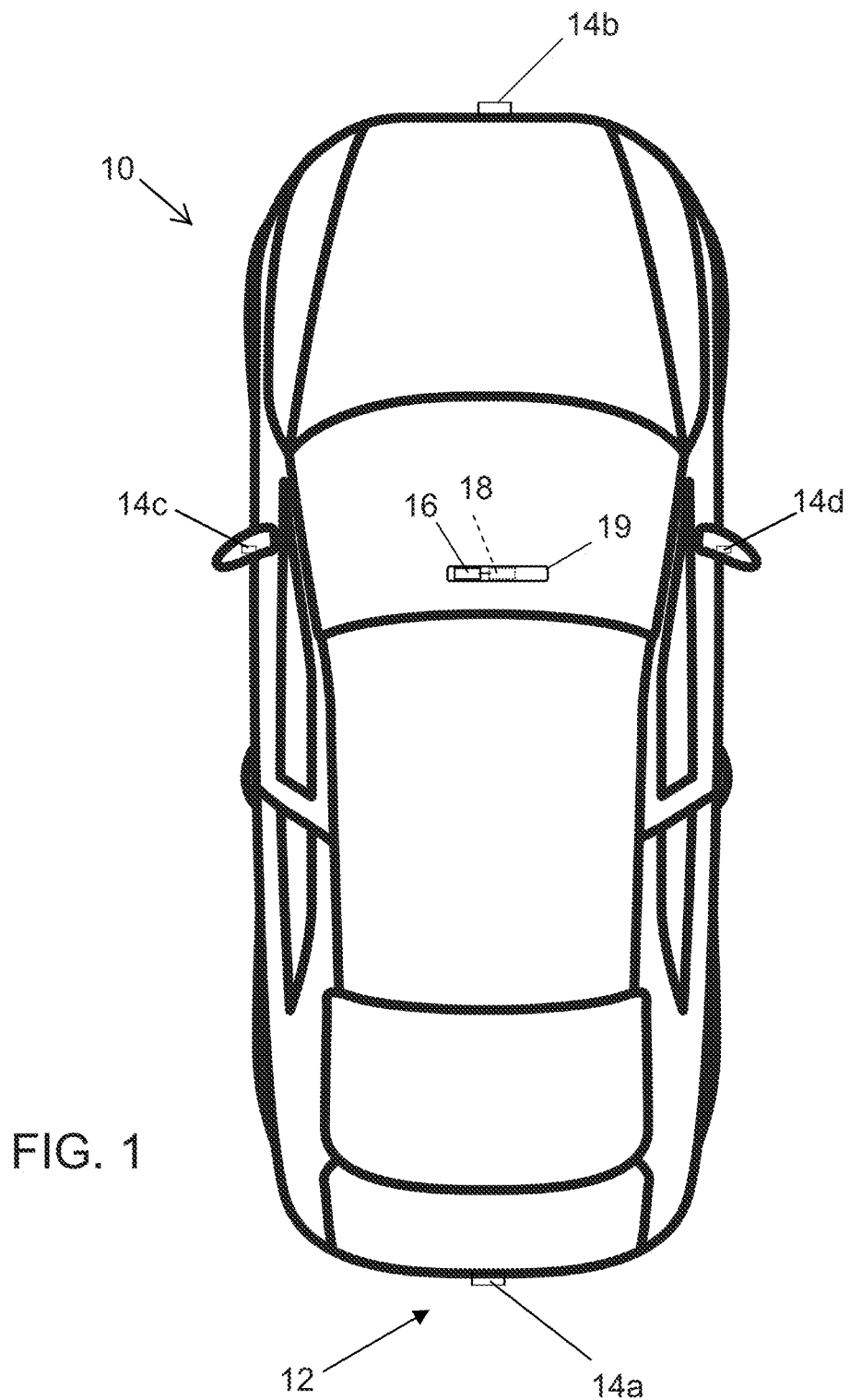
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 19 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Autonomous and semi-autonomous driving and parking vehicles are known. Most use RADAR and/or camera sensor data. Most parking systems are ultrasound (only) sensor based. Often, parallel parking is seen as easier to accomplish than perpendicular parking because the sensors may have difficulty in perceiving potential parking depths. Parking lot management, platoon control and emergency braking and evasive steering systems using vehicle to infrastructure (V2X) communication systems are also known. Typically, it is a challenge to fuse multiple sensors' data to generate an understanding of the environmental scene. Typically, computation time is key while lean hardware performance is available. As described in U.S. Publication No. US-2014-0067206, which is hereby incorporated herein by reference in its entirety, environmental scene data understanding may be used for further computing in a collision avoidance and evasive steering and braking system.

The present invention provides an environmental sensor processing and scene understanding system having a classification algorithm in use, such as by utilizing aspects of the systems described in U.S. Publication No. US-2015-0042808, which is hereby incorporated herein by reference in its entirety. In there it was shown to preset a K nearest neighbor vector table with K-means (vector quantization) classified image wavelets plus class clusters (for classifying the probability to each class) of 8×8 pixel image segments. A consecutive chain of three Markov model stages was used for correcting wrongly classified segments on hand its surrounding context.

As an optional aspect of the present invention, and additional to the 64 DCT (one of each wave component) clusters plus five classes clusters, there may be additional clusters in use for rating the distance of a segment relative to the camera or any other reference system. Alternatively or additionally, there may be another additional cluster for rating the segments' surface orientation (vector) relative to the camera or other reference system. The distance and orientation may be provided by a reference system (which will not or will not fully present at run time (serial product)) during the learn time of the classifier, such as a high resolution RADAR, LIDAR, TOF, Structure from Motion, stereo vision or mono vision back projection system or combinations of these.

The algorithm of U.S. Publication No. US-2015-0042808 outputs 8×8 pixel classified segments of each frame of a vehicle's (rear) camera. The scene understanding system of the present invention may map each frame's classification segments of each camera into one each (space wise) environmental scene's grid map. The scene understanding system may include and utilize an image processing system to build one independent environmental scene's map of every camera (one or more) and optionally every possible additional sensor, such as tire pressure sensors, a rain sensor, suspension damper sensors, ultrasound sensors, LIDAR sensors, RADAR sensors, TOF sensors or structured light sensors, relative gray level transition sensors (such as utilizing aspects of the systems described in U.S. provisional applications, Ser. No. 62/064,146, filed Oct. 15, 2014, and/or Ser. No. 62/060,812, filed Oct. 7, 2014, which are hereby incorporated herein by reference in their entireties), Terahertz EM wave sensors, imagers in invisible wave lengths such as near infrared, far infrared, ultraviolet and/or the like. Preferably, the sensors' maps are limited to the extension of their current detection range while the master scene's map (the 'Environment and Object map') will grow while more of the environmental scene rolls into the sensor's detection range while the vehicle is driving. All sensor's scene patches will be added (superposed) according to their sample time stamp and position. The ego position may be tracked via the vehicle's ego motion. The map may move relative to the vehicle or the vehicle relative to the map. Optionally, the ego motion may be input by a preprocessed or direct sensor input, generated via 'motion flow' or calculated via steering angle or wheel tic speed or in combination of several of these.

Some of these sensors may contribute to the grid map in just digital such as an ultrasonic or RADAR sensors without being processed by DCT since its resolution may be too low for achieving a beneficial information. Some others may be classified as analog to the image processing via DCT vector quantization and K-Means image processing algorithm, such as by utilizing aspects of the systems described in U.S. Publication No. US-2015-0042808, incorporated above.

Figure 19:
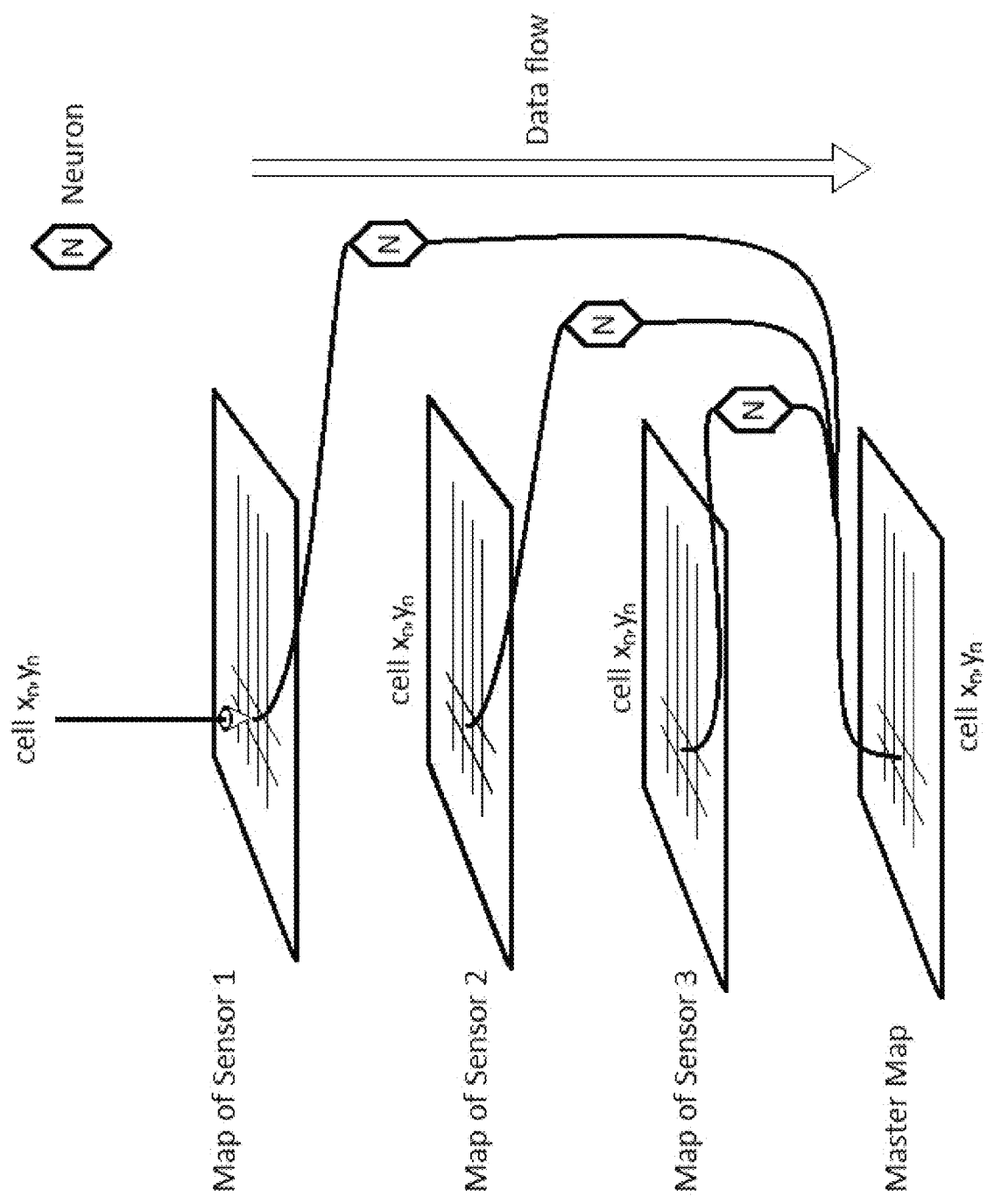
FIG. 19 shows the blending of three sensor source maps into one master map, shown with each source map's cell linked to the according master map by a neuron.
Figure 25:
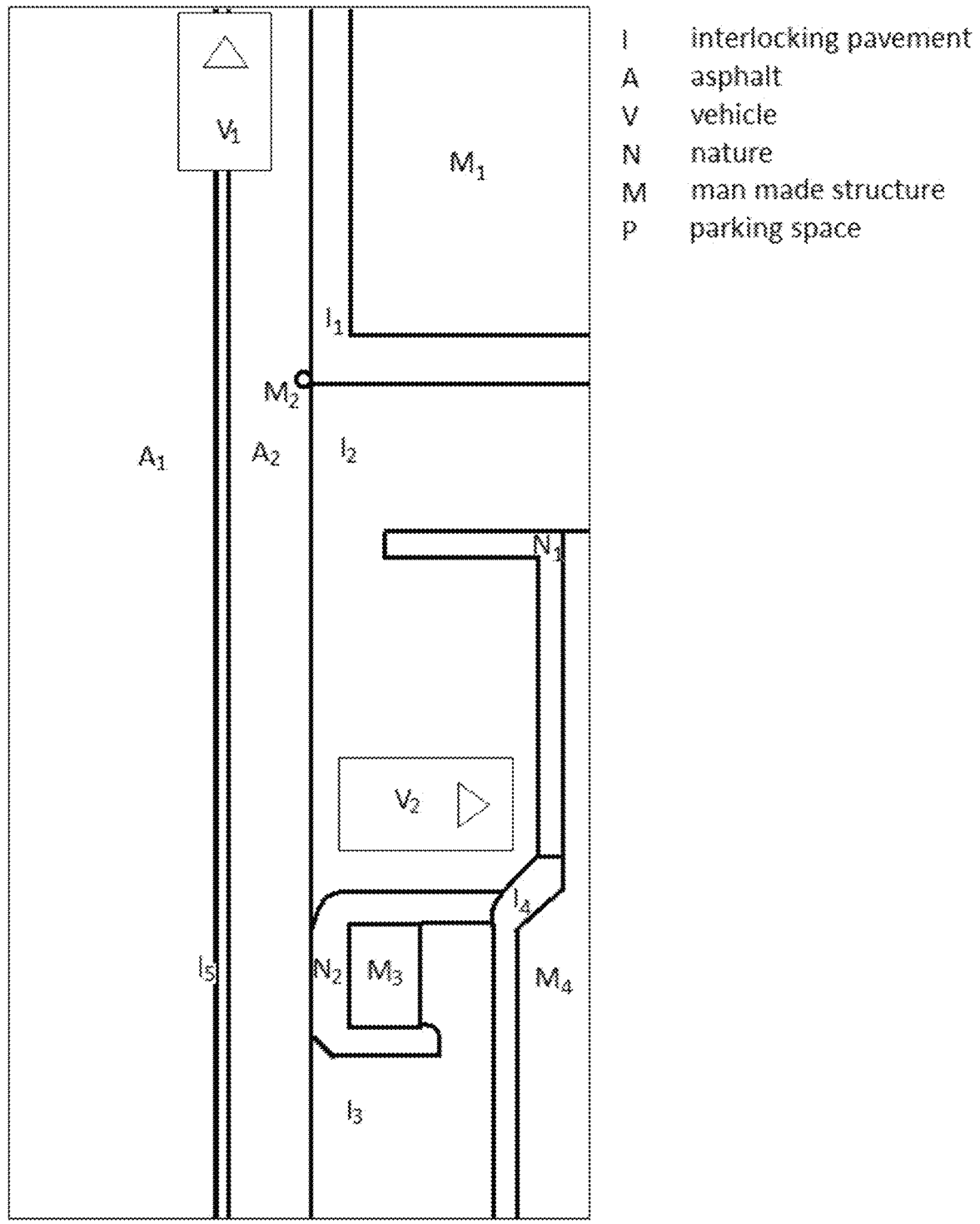
FIG. 25 shows a system memory 2D mapping containing labeled object patches with correct dimensions of the scene of FIG. 24, after the captured data of the scene is processed by the sensor and classification algorithms of the present invention.
Figure 27:
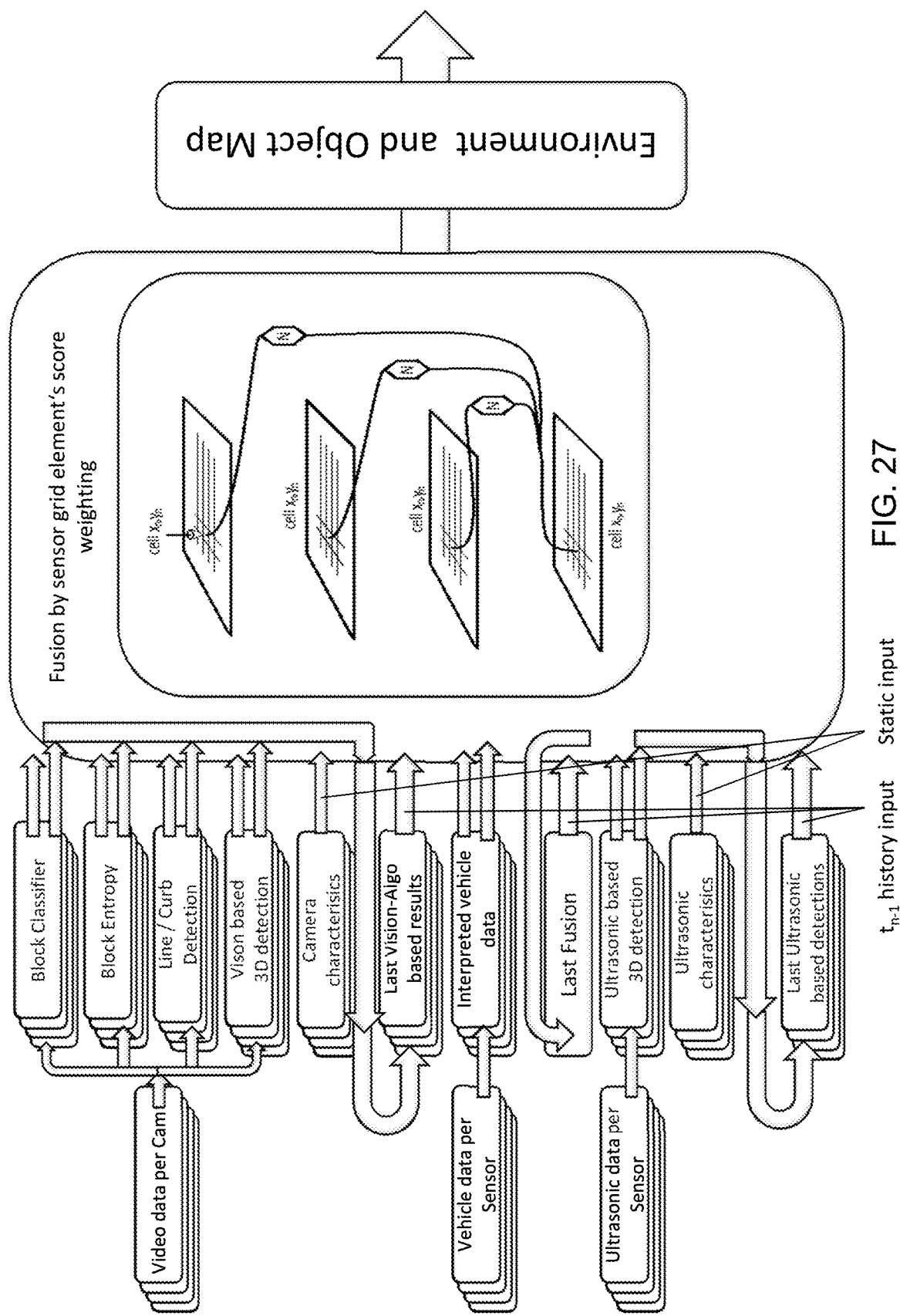
FIG. 27 shows the results of each map's classifiers, sensor data, preprocessed sensor data, historical sensor input data and static sensor characteristic data (as grid map), which are fused via mapping each cell of identical position to a master cell via neuron's for generating an environmental map, with static and dynamic weighting scores used for filtering how strong each map's cell's value is weighted to generate the master map's cell value.

Optionally, some (single) sensors may be processed by multiple algorithms, having multiple outputs. A camera image stream may be image processed by a classification algorithm as discussed above delivering one output (a class map) and may be processed by an edge detection algorithm delivering a second possibly independent output (a map of contrast edges possibly for being interpreted as a lane). Optionally, identical single sensors, clustered sensors or combination of sensors may be image computed by more than one computation algorithm. The output of each algorithm (such as, for example, an environmental scene's map generated by an ultrasound cluster or processing system) may be computed further as single 'sensor' source. The maps may have grids of different resolution depending on the sensors' resolutions. The (multiple) maps may be blended or superposed to one global map (or 'master map') or (more sophisticated) linked to one global map by neural linking of the map grid's space-wise according cell (not necessarily, but optionally also time-wise), see FIGS. 19 and 27. The neuron weighting against the other maps' neuron weightings (of the same position) will be set by static and dynamic score metrics derived out of the according sensors' properties (as described below). The output will then be an annotated 'Environment and Object map,' or may be transferred into a vector map such as shown in FIG. 25. Optionally, the grid may be transferred into a vector map with rising distance as describe below. The surface patches or object items involved may have cells labeled 'drivable surface, asphalt,' 'drivable surface, interlocking pavement,' 'nature,' 'man made structure' or the like.

Figure 28:
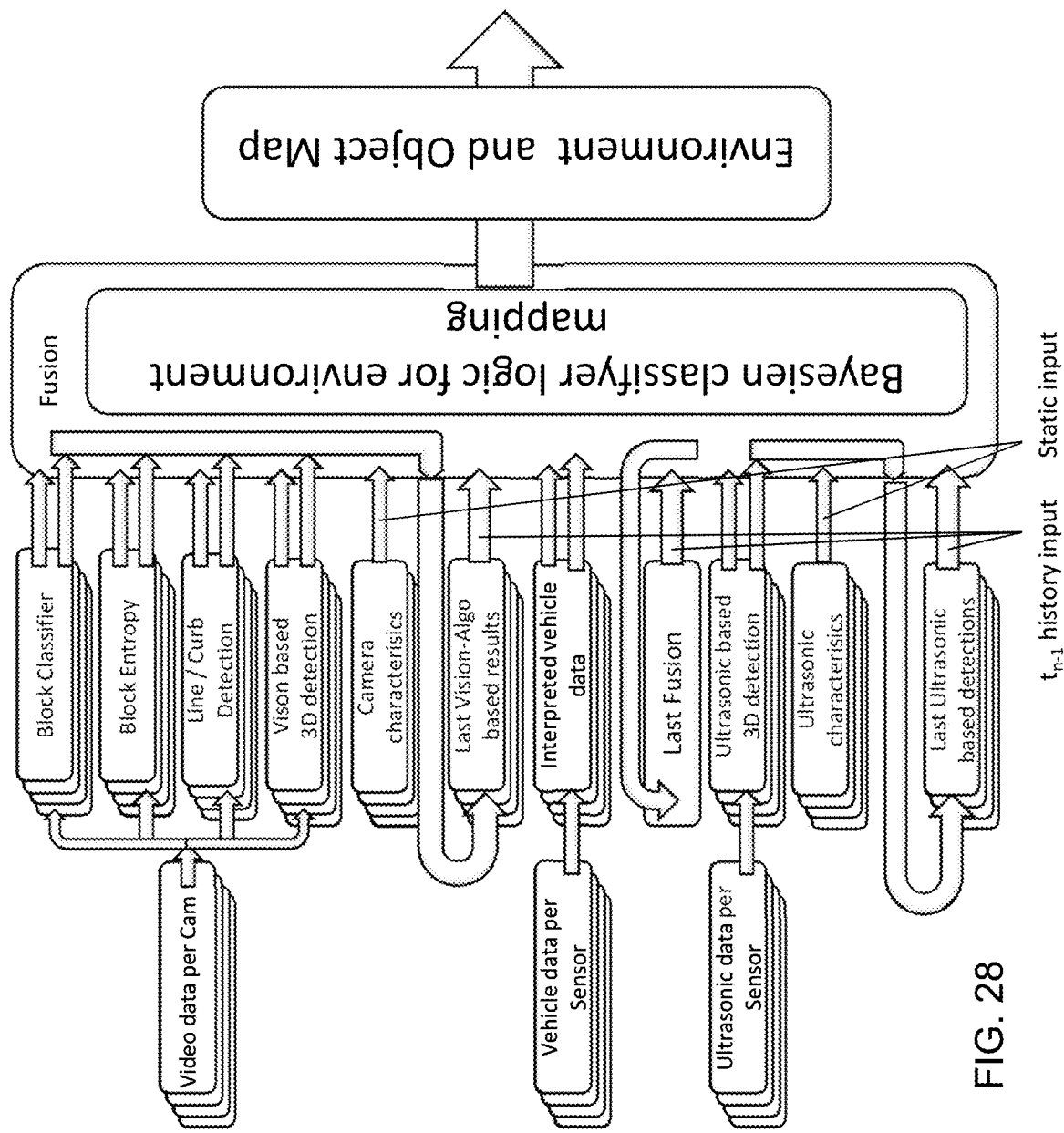
FIG. 28 shows use of identical inputs for generating an environment and object map, but instead a neural network it uses a (prior learned) Baysien classifier.

As a more sophisticated option of this system, a scene understanding system may have a classification algorithm in use instead of just a neuron classifying the actual grid element (or cell) in view of each specific sensor. Optionally, a global classifier may be fed by the results of each map's optional classifiers, direct sensor data (e.g., wheel tics), preprocessed sensor data (block entropy, curb detection, 3D vision (e.g., from stereo) or merged ultrasonic sensor cluster signal), see FIG. 28, and optionally historical (n−1, n−2 . . . ) sensor input data may be input as well. The master map classifier may be of a kind of Baysien or Adaboost classifier. Any kind of sensor or pre-processed sensor information or static vehicle or sensor behavior data input may be beneficial for the classifier to generate the best possible scene understanding. By that the classifier may be fed by online sensor data, but also with the camera's lens map function, imager behavior (e.g., temperature, wave length dependent light sensitivity, optical properties of the pixels, and the like), or ultrasound sensor coil information (see FIGS. 27, 28 and 29) or specifying properties of a LIDAR, RADAR, wheel tic sensor or the like. Useless or redundant information will be eliminated while the learning progresses to its optimum.

Using neurons and/or a classifier architecture, optionally there may be an (adaptive) learning algorithm employed for changing parameters of neuros or classification models or setting or eliminating the neural connections and neuron parameters by feedback learning. The feedback may be generated in a way that allows to distinguish (score) positive from negative progress in scene understanding. The criteria may be firstly the spacewise (3D or 2D) accuracy of the mapped position of objects and it surface contours in relation to its position in reality and secondly the accurate object (or surface) classification. This may be done during algorithm learning in vehicle development and application and fixedly written into the automated scene understanding system's parameter memory at production time. Alternatively, there may be a kind of standard start setting (in a quality between fully empty and well learned) at production time and the system may learn and improve during the time of regular use in case feedback generation is possible by any kind of reference sensor or scene understanding system. Optionally, the reference information may come from external calibration facilities or from any other infrastructure which has sensors (such as intersections with RADAR and cameras) or from other or foreign vehicles which generate an own scene understanding and transmit its data via wireless, radio or light based data transmission. The ego system may than use its position relative to its position in the foreign system as feedback learning input. Since it will be unknown whether possible deviations are generated by the own or by the foreign scene understanding system the foreign input may be taken over in a dampened manner (e.g., by about 1 percent).

The learning may aim to always provide or determine the relatively most valuable, relevant or reliable (this may be redundant, interchangeable or alternative) information of a specific sensor or detection algorithm higher than relatively less valuable, relevant or reliable information. When using classifier for sensor fusion as discussed above, the below discussed static and dynamic scoring may still find use as preprocessed input. Alternatively and preferably, the classifier may learn how strong to weight one sensor's input in whatever environmental condition by itself. Optionally, there may be different neural grid modes or classification models for different points of time which may periodically be switched due to the dynamic availability or reliability (discussed below) of some sensors. Some may have higher sample rates than others. For example, ultrasound sensors may have sample rates up to about 20 Hz while a visual camera may have sample rates of about 100 Hz. Because the information of the ultrasound sensor is only every fifth time available as compared to the availability of a visual image information, the neural grid of the ultrasound may be switched on only every fifth time to be reflected in the global result and the visual camera's input every time.

Figure 20:
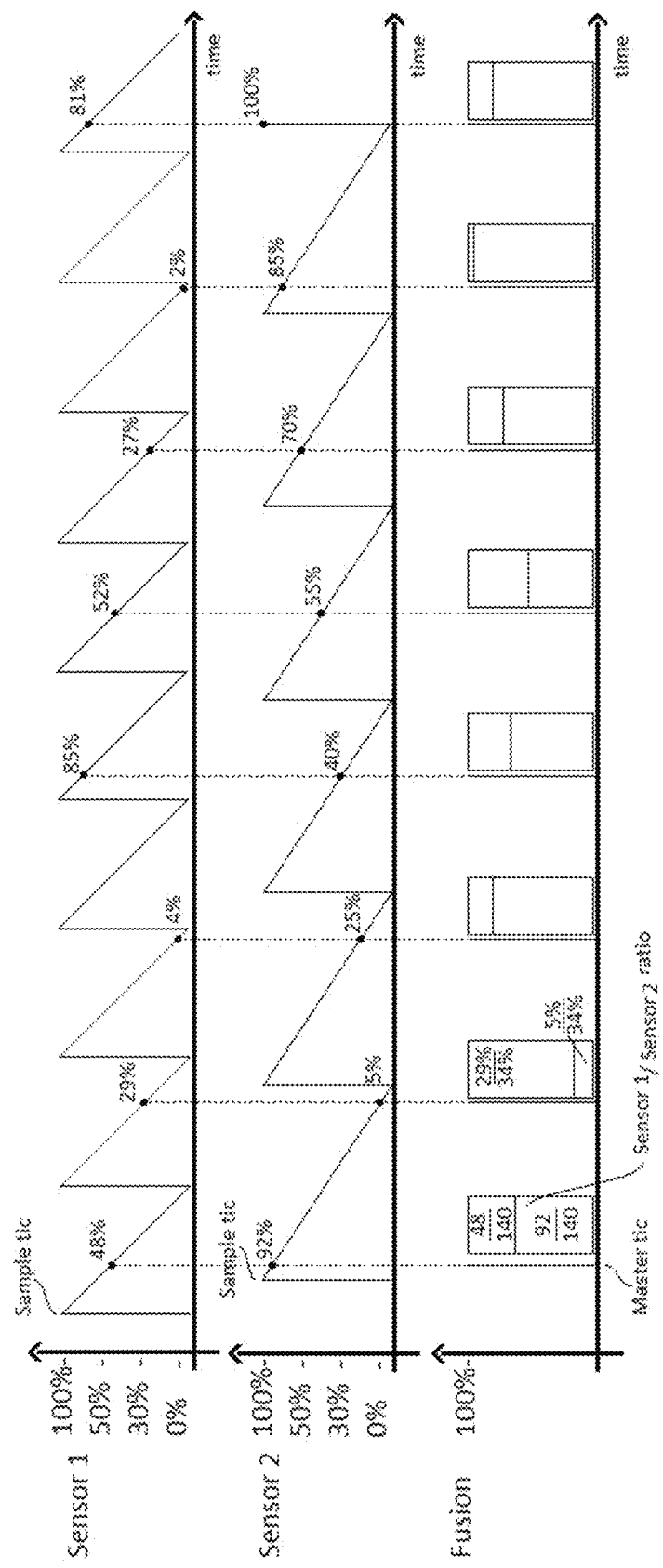
FIG. 20 shows how two sensor source inputs can be fused (blended) also when the inputs are ticking asynchronously to the master time tic, with the sum of both sensors' signal weighting always 100 percent, and with both time scores defining the quotient of how strong one sensor is weighted against the other.

Optionally, the sensors may possess an availability scoring. Sensors with low availability due to slow sample rates may fill the grid every time when available and their information availability score may degenerate stepwise in every consecutive global sample tic until being refreshed when available again (at another sample time). Besides a 'static reliability score' and a 'dynamic reliability score,' discussed below, the availability score will contribute to the amount of how high a sensor's or algorithm's map will contribute to the (end result's) master map. Less advanced systems may have one score for the full map, while more advanced systems may have scores for each single grid element or areas of grid elements. Asynchronous sampling may be usable as well by not degenerating past samples stepwise but by analog time constant quotients (filters, possibly by a (pseudo-) time constant of about ten sample frames), which equates to time wise interpolation, see FIG. 20.

Optionally, besides the availability, the classifier may also state the dynamic reliability score of the grid element's classification (done on each single frame). As discussed above, the reliability level (score) may contribute to how far a sensor's cell information contributes to the end result or master map.

Figure 21:
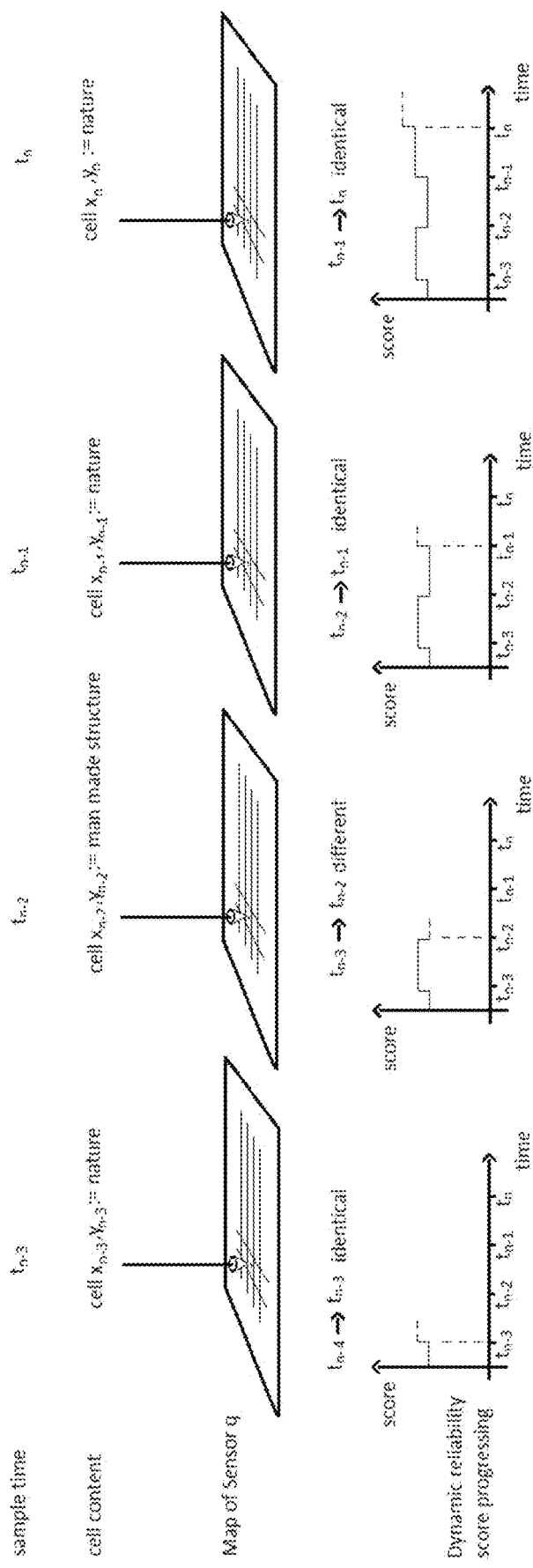
FIG. 21 shows how the interchanging of a map grid cell's classification value of a map of sensor q influences the dynamic reliability score over time, when the cell content changes, the score progresses downward, and when steady or identical, the score progresses upwardly.
Figure 30:
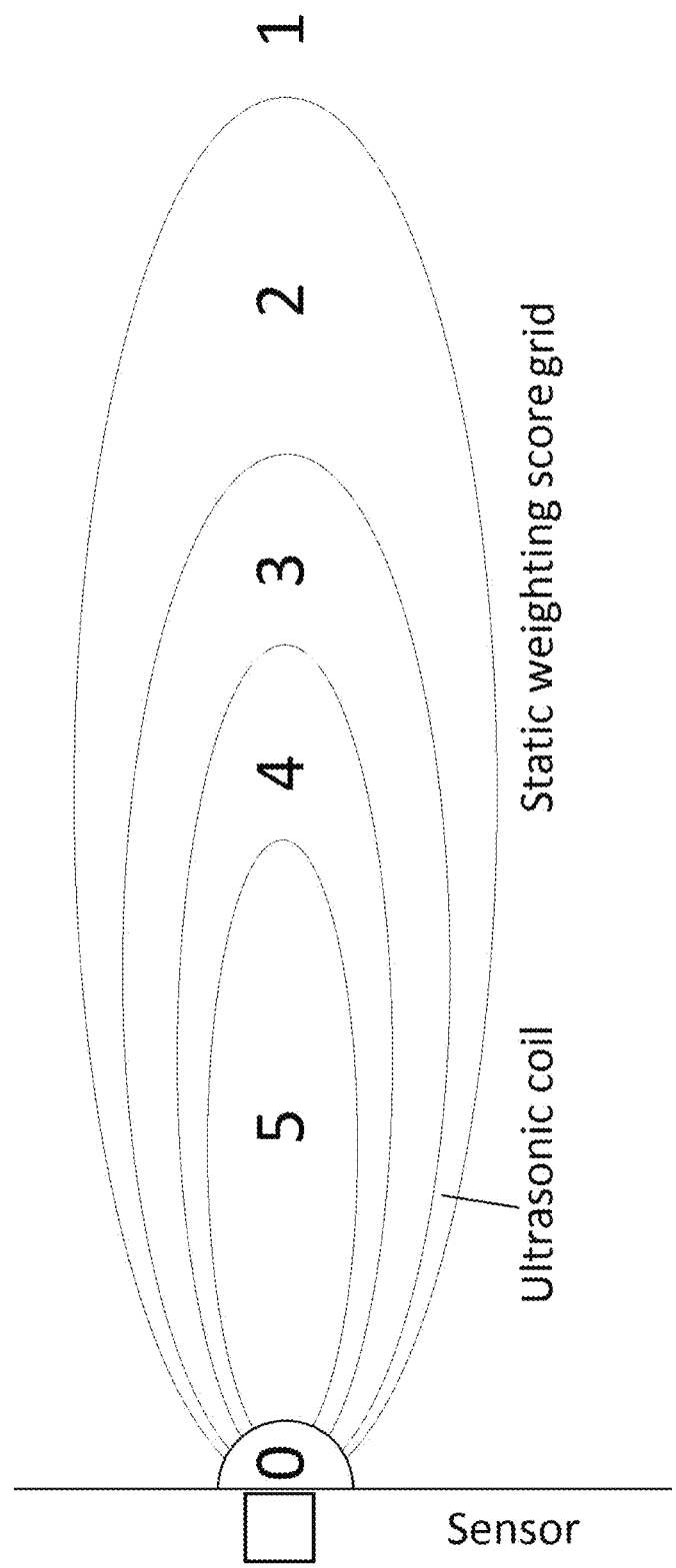
FIG. 30 shows an example of a static grid map of an ultrasonic sensor used for weighting the ultrasound sensor signal against other sensors' signals contributing to the master map.

Optionally, the dynamic reliability score of each cell of a specific sensor's map may be influenced by how steady over time the cell's frame-wise classification is. At times when a cell state may flicker a lot from one class to another and back over consecutive frames, the dynamic reliability score of this sensor's map's cell may be counted down (such as in a PT1 filter curve, such as, for example, by a (pseudo-) time constant of about 10 frames), and at times when the class stays constant, the cell's reliability score may be counted up (such as in a PT1 filter curve) until near or close to or about 100 percent (such as almost always constant), such as shown in FIG. 21. This opens up a time dimension to automotive environmental sensor classificators or classifiers. Optionally, the static reliability score may be increased or decreased by a control which reflects parameters from outside (the controls properties may be based on experience). The static reliability of one sensor's whole map's segments may be influenced commonly or there may be one score for the whole map. The static score may typically have areas of the sensor's map at which it is higher and areas at which it is lower or zero. For example, the coil characteristic of an ultrasonic sensor may be translated to a static reliability score map. The static reliability score of an ultrasound sensor's scene map may be diminished at segments at which the distance parameter may be less about 0.3 m (such as known by the master map by preceding detection cycles (temporal filter content) since at such distances the sensor's signal becomes over-tuned due to heavy ultrasound echoing, such as can be seen with reference to FIG. 30.

The map entries may be held steady with the exception of sensors, which may be switchable in between modes: a visual camera (sensor input) may be interchangeable between, for example, a 15 fps mode and a 30 fps mode. The static reliability score at night time may increase when the camera is tuned into 15 fps, and the dynamic reliability score may decrease stronger with rising vehicle speed in nearby areas of view (due to higher blurring), such as by utilizing aspects of the systems described in U.S. Publication No. US-2014-0354811, which is hereby incorporated herein by reference in its entirety. As another example, the reliability score of the block entropy (discussed below) algorithm scene map may be increased at segments at which the light condition exceeds a certain threshold or a ratio compared to the whole image's brightness or controlled by an HDR parameter.

As another option, the scene's master map cell entries, or as an alternative option the single sensor's or source algorithm's scene entries, may underlay an artificial aging. Each cell may have a kind of last update timestamp or time score. As like the other scorings, the time score may be higher the newer the least entry was or entries were and may degenerate over time step wise or in a downward curve. The less the time score the less high the map's cell entry is weighted for vehicle path planning or reflected to decision makings. Optionally, the score may be conjuncted to the way of travel the vehicle took until a specific cell time score was entered. As a more sophisticated option, the cell's content may be blurred circumferentially around the source cell to the neighboring cell values (which itself gets blurred depending on their time score at the same time). The purpose of doing this is to represent the inaccuracy of the vehicle's ego motion relative to the maps and/or to eliminate false safety concerning scene content, which may now be out of the sensor view but may have been seen earlier.

As an alternative option, the captured map or maps may grow while the vehicle is deriving added new content on the current vehicle sensor positions. The map extends longitudinally substantially by the length of the way the vehicle was driven and may have the widths of the sensor's detection range sidewardly. When the vehicle follows a curve, the map extends in a curved manner. The system's memory organization may be independent from the geometrically structure of the maps it is storing. Due to memory limit constraints, it may be necessary or desired to reduce or dump map data while the vehicle continues driving and to add new map data content substantially at the current spot it is located. Optionally, the system of the present invention may dump the data first that are the farthest from and behind the actual vehicle position. This equates to a data cropping on the map's rear edges. Optionally, the system may dump the data first that are the oldest. Optionally, the system may reduce the map's data resolution increasingly with raising distance and/or age such as shown in example of FIG. 22. Optionally, when it comes to dumping map data, the system may merge annotated regions with the same labeling to labeled single objects (such as, for example, with position, extension and label) or object vectors (just the borderline of objects or annotated patches). The object vectors mapping may be done in a way similar to the mapping Open Street Map® data. There may be a metric to keep the objects (such as, for example, possible obstacles) or regions of interest in memory with high relevance, during dumping objects of low importance more early or with less distance. The system may store the way of travel the vehicle took relative to the stored map and object vectors, such as can be seen with reference to FIGS. 23, 24 and 25.

Optionally, a more sophisticated scene understanding system in accordance with the present invention may be able to classify a scene not just frame by frame (except from some temporal filters being influenced from the past) but by analyzing or classifying the content of sets of consecutive frames for being similar to known or prior learned content of sequences of frames. The context of a frame may be added as information to the class vector during the learning period or time period while the system is learning. By that the system will be able to provide the context information of a scene sequences context content. A scene may be labeled, such as, for example, as 'person walking', 'person starts walking', 'person is crossing', 'person entering vehicle', 'bicycle entering traffic' and/or the like. That context may be helpful in controlling parameters of the vision interpretation algorithm itself or interaction of autonomous or semi-autonomous vehicles or automotive vehicle functions such as automated head lamp high beam control. The beam state of the subject vehicle may be dimmed from a high beam state to a low beam state as soon a 'person is crossing' is detected (classified) by being determined as similar to prior learned sequence of frames annotated that way via its class vectors.

Figure 24:
FIG. 24 shows a real parking scene which may be captured by one or more or several vehicle sensors and being processed by its scene understanding system for supporting an automated parking system of the present invention.
Figure 26:
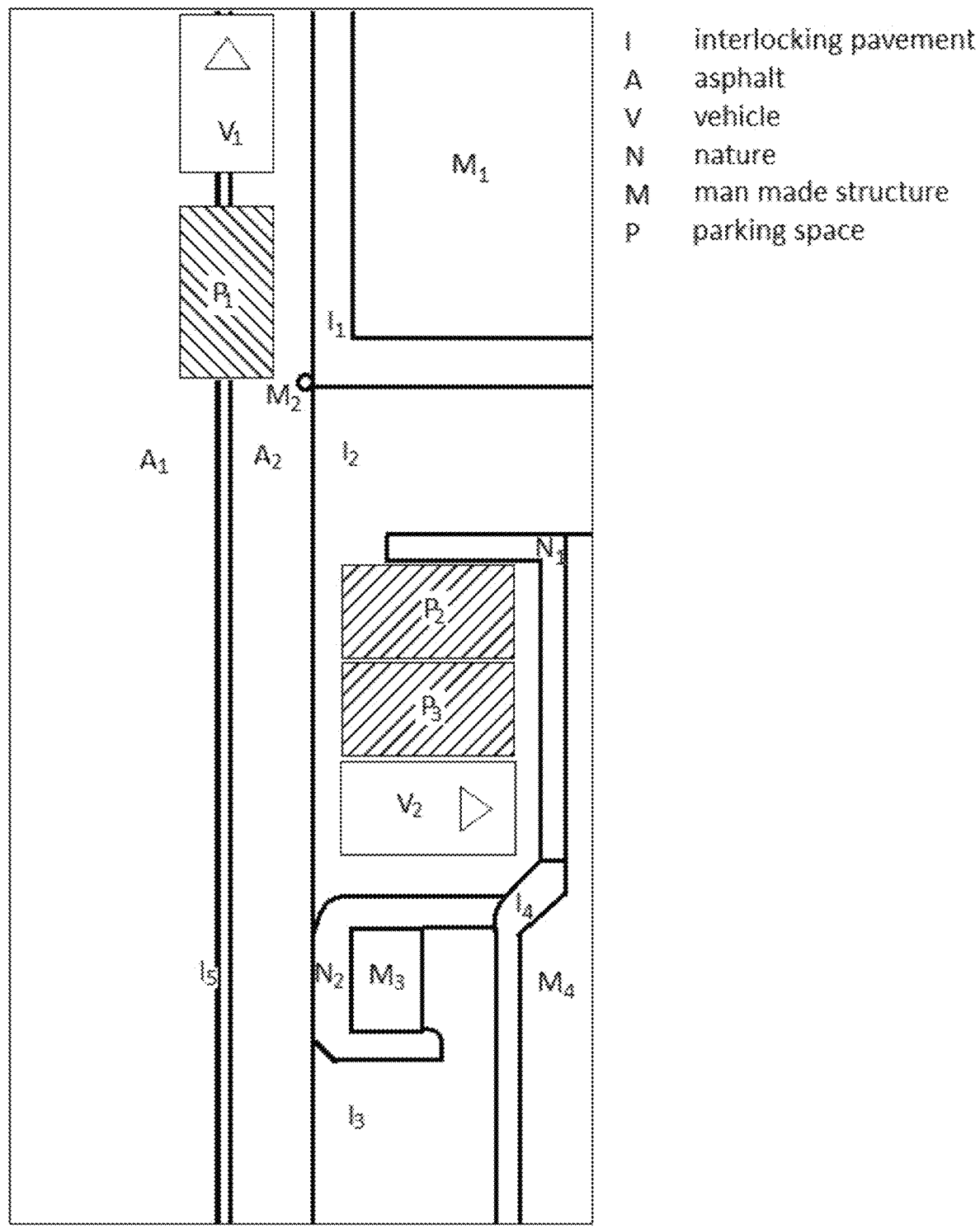
FIG. 26 is an HMI scene display having a predicted parking spaces overlay for the driver to choose from, generated by the context scene understanding classifier by processing the map input from FIG. 25 of the scene from FIG. 24.
Figure 29:
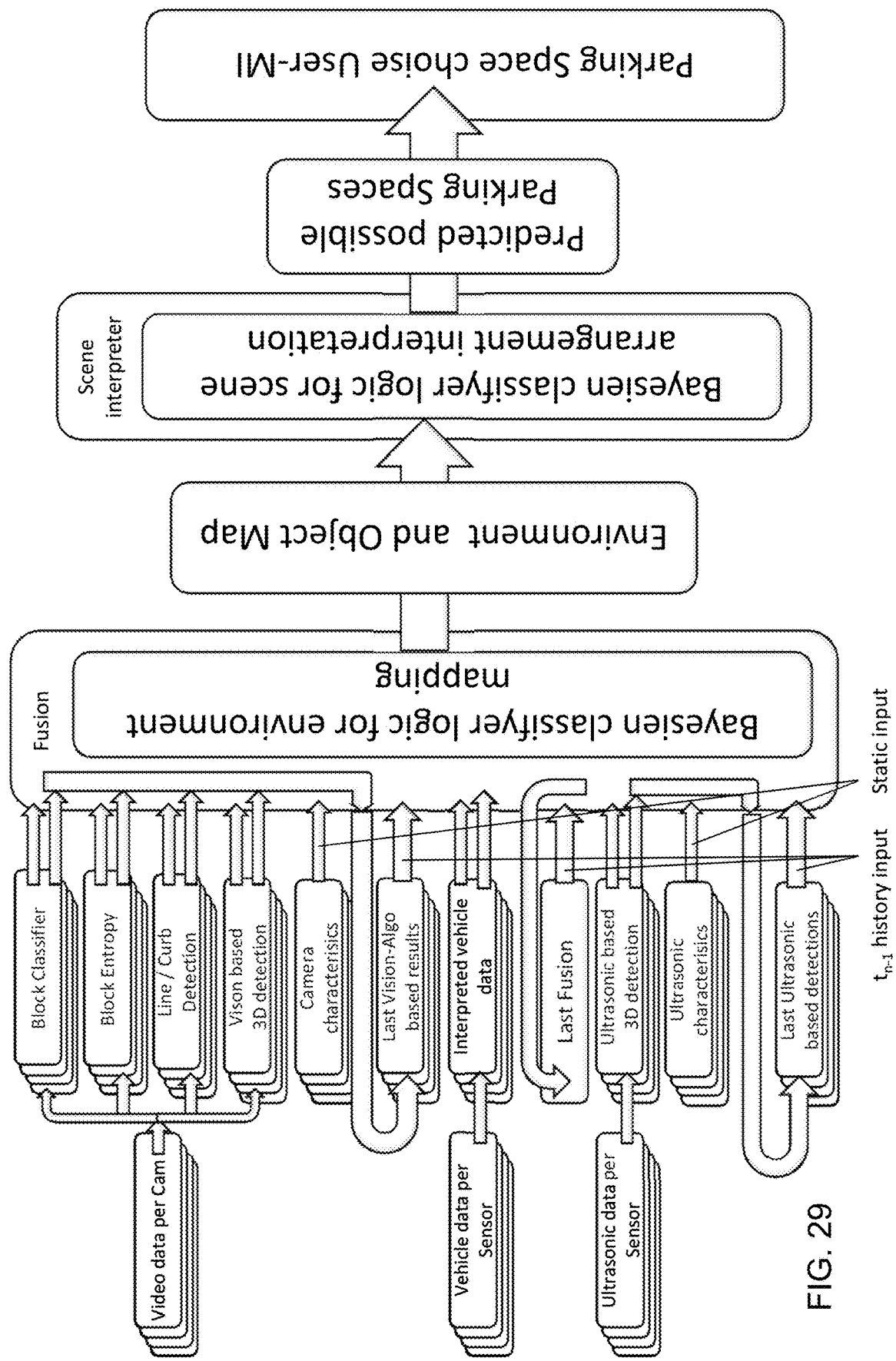
FIG. 29 shows a scene understanding and classification system in use for an automated parking system of the present invention for a feasible (probable) parking spot prediction, where the system uses the same inputs as the 'environment and object map' generating systems of FIGS. 27 and 28, and where, additionally, this architecture shows a consecutive scene interpreter using a Baysien classifier logic for interpreting the scene patches arrangements for predicting the possible parking spots which are output to a user machine interface.

Optionally, an even more sophisticated scene understanding system of the present invention may have a (numerical) classification algorithm (such as, for example, of Baysien or Adaboost type or the like) consecutive to the above described sensor grid cell based classifier or scene understanding classifier processing delivering objects or areas or patches of annotated cells. The numerical classifier may have learned or previously stored the environmental scene patches items, represented by the given arrangement of areas or patches with annotated cells. The scene object items may be built or generated by bundling coherent identically annotated grid cells. The classifier then will output the higher context or meaning of a scene. In the example of FIG. 29, such a scene (understanding and) classification system is used in an automated parking system as referred below. The scene's context of the change in the drivable surface (such as, for example, from asphalt to interlocking pavement aside a store divided by a sidewalk, flanked by a stretch of bushes or the like) may be interpreted by the (numerical) classifier as a parking space as opposed to the street area, which are both drivable. FIG. 24 shows a real scene similar to the scene described above. The scene understanding's classifier may output an according two dimensional (2D) scene map such as shown in FIG. 25. It may be assumed that the whole scene would have been in sensor range, otherwise some unannotated spots would be present there. The higher scene context understanding system may conclude out of the labeled scene elements arrangement at which positions a parking space would be probable for being predicted, shown via the vehicle's HMI, such as shown in FIG. 26.

Optionally, one of the image computation algorithms for generating an environmental scene's map above may be a block entropy algorithm. Optionally, the block entropy algorithm may have a feedback control loop for controlling camera gain parameters or high dynamic range (HDR) parameters.

As discussed above, the system may compute the same sensor's input by different computation algorithms. One optional combination may be to use block entropy in combination with a scene classification algorithm. This is advantageous since the block entropy works also in bright light, when surface structures become overexposed, while the classification algorithm works well in balanced light conditions. The above HDR and/or gain camera control may be done for optimizing both environmental scene's map algorithm at a time or alternatively in sequence for combing the output in sequence. Alternatively, the control may be done in a way to optimize one of both algorithms' input at times when these algorithms are strongest according to the lighting conditions.

As an example, the environmental scene understanding algorithm of the present invention may find use in an autonomous or semi-autonomous vehicle driving control system or vehicle driver aiding system for enlarging the environmental scene's map. Optionally, additionally or alternatively, GPS and road map data (such as, for example, Open Street Map® data) may be taken into account. The geo positioning data may be handled as another sensor input. Since the navigation system's GPS road map is statically present in the memory with nearly infinite extension, the comparable local map with comparably high resolution may be centered to the wide range GPS map's position. By that, more global data are available in context to the vehicle inherent sensor data. Open Street Map® data may have the advantage in being updated close to real time (such as within a matter of seconds).

Optionally, additionally or alternatively, remote real time and non-real time scene context data provided via any kind of radio transmission may be taken into account (such as by utilizing aspects of the systems described in U.S. Publication Nos. US-2014-0375476; US-2015-0124096 and/or US-2013-0116859 and/or U.S. patent application Ser. No. 14/636,503, filed Mar. 3, 2015 and published Sep. 10, 2015 as U.S. Publication No. US-2015-0251599, and/or Ser. No. 14/561,794, filed Dec. 5, 2014 and published Jun. 11, 2015 as U.S. Publication No. US-2015-0158499, which are all hereby incorporated herein by reference in their entireties. Optionally, the remote data may be transmitted by light pattern codes, such as by the emission of a TOF flash or structured light flashlight. Optionally, the data transmission may be done via mono- or bidirectional light pattern code emitted by car inherent LEDs or LASER LEDs and optionally received by normal vision or infrared cameras or optionally by cameras equipped with gray level transition sensors, since these have a high sample rate (such as described in U.S. provisional applications, Ser. No. 62/064, 146 and/or Ser. No. 62/060,812, incorporated above). Optionally, the remote data may contain local area context information provided via a server or directly via car2car (v2v) or car2infrastructure (v2x) network grid (which may be knitted spontaneously and/or temporarily with other vehicles and/or infrastructure, such as also described in the above referenced U.S. Publication No. US-2013-0116859).

For example, an automated parking system may receive static parking lot position information and it regularities, such as mother and child parking, handicapped parking, senior parking or women only parking. More sophisticated remote data connected systems may transmit and receive online context data, such as by utilizing aspects of the systems described in International Publication No. WO 2013/109869, which is hereby incorporated herein by reference in its entirety. In there it was suggested to transmit the visual data of remote vehicle vision systems together with time and location information of potentially free parking spots. The user had to determine by the vision whether or not the transmitted scene may be a parking spot or possibly just an entrance. In contrast to that, the scene understanding system of the present invention may be able to discriminate the parking scene context by itself by processing remote vehicles' sensor data input.

The remote server's or vehicle sensor's data may be dedicated to different vehicle sensors or group of sensors or may be a fusion or blend of several sensor's context. That context may be mapped as another which contributes to the master map, having a reliability and availability score and a time stamp. Optionally, the incoming map may be in the format of a vector map (similar to the used by Open Street Map®). Since the vehicle sensor's range is always limited in ranging distance, the context server's map input may take influence mostly to the more long ranging decision makings and aidings, such as, for example, in avoiding a pot hole. For holding the precious storing capacities and transmission bandwidths in a reasonable level, the vehicle may interchange its context data in a collaborative file sharing (bit-torrent like for vehicle data instead of internet files) peer to peer structure. Since any scene's data context is locally fixed (with the exception of vehicles on a ferry or the like), the peers approaching a specific location may receive context data packages from vehicles just passing the specific location's scene (in front) and may send context data packages of their current location to other or consecutive vehicles.

Such a system will work best as much crowded a road scene may be. It will allow to plan and organize collaborative maneuvers for vehicle grouping and organization, such as platooning, but also the smoothly crossing of a platoon by a single vehicle or another group or platoon. That may be necessary on motorway interchanges. The vehicle may be able to cross intersections with no need for anybody to stop, since time and place and desired proceeding path will be predetermined and commonly transmitted over all involved traffic participants, possibly several seconds before reaching an intersection. Optionally, also the therefore necessary planning calculations may be processed by peer wise provided processing resources. By that, all peer vehicle and/or connected infrastructure may contribute to the overall smooth and optionally, economic, fair and ethical vehicle path planning.

As another example the environmental scene understanding algorithm of the present invention may be used in an automated vehicle parking system.

It is known to detect the environment in view of the rear camera of the vehicle, viewing rearward and sideward of the vehicle, while the vehicle is driving forward. Typically, this is done while the vehicle is in a driver driven "parking spot search mode." Typically, environmental maps may be created during such driving modes. As soon as a (parking) gap seems to be larger or large enough for the vehicle to fit into, the spot is declared as a possible parking spot for the vehicle. Typically, a human machine interface (HMI) signals the found spot to the driver. The driver then may decide to park at or in that found spot or may proceed with further searching. When parking in the spot, the system typically takes over the steering and leaves accelerating and braking to the driver. The choice of the gear may be signaled to the driver, may be automated or may be left to the driver alone. Known advanced systems may accelerate and brake and shift gears autonomously and may maneuver until the vehicle is finally parked into the spot sufficiently. Further advanced systems may extend the vehicle control to a smart phone. The smart phone may show a feedback from the environmental vehicle sensors for enabling the driver to prevent crashes to objects or persons.

Due to safety requirements, U.S. vehicles soon will have at least one rear camera as minimum requirement. To utilize one rear camera best, it is desirable to achieve an autonomous parking system with just one rear camera and no additional sensors. As additional customer benefit, autonomous parking systems may not just park in autonomously but may pull out of the parking spot as well. With parallel parking situations, unlike when parking in, the gap to a potential vehicle in front may be unknown when trying to pull out since the vehicle in front may have changed while the subject vehicle was parked. The (only) rear camera will not be able to detect the distance to a vehicle forward of the subject vehicle or parking gaps in front of the subject vehicle.

When a vehicle's automated parking system is in a search mode for finding a suitable parking spot, the vehicle is typically driving forward at a medium speed to be able to compute the sensors input in time and to not overshoot possible parking spots too far. Optionally, the parking system of the present invention may draw its map while the vehicle is being driven, extending it at areas which come in view. As described above, by that, the captured map or maps extend longitudinally substantially by the length of way the vehicle was driven and have the widths of the sensors detection range sidewardly. When the vehicle follows a curve, the map extends in a curved manner. The system's memory organization may be independent from the geometrically structure of the maps it is storing. Due to memory limit constraints, it may be necessary to reduce or dump map data while the vehicle continues driving and adding new map data content substantially at the current spot or location at which it is located. Optionally, the system of the present invention may dump the data first which are the farthest from and behind the actual vehicle position. This equates to a data cropping on the map's rear edges. Optionally, the system may dump the data first which are the oldest.

Figure 22:
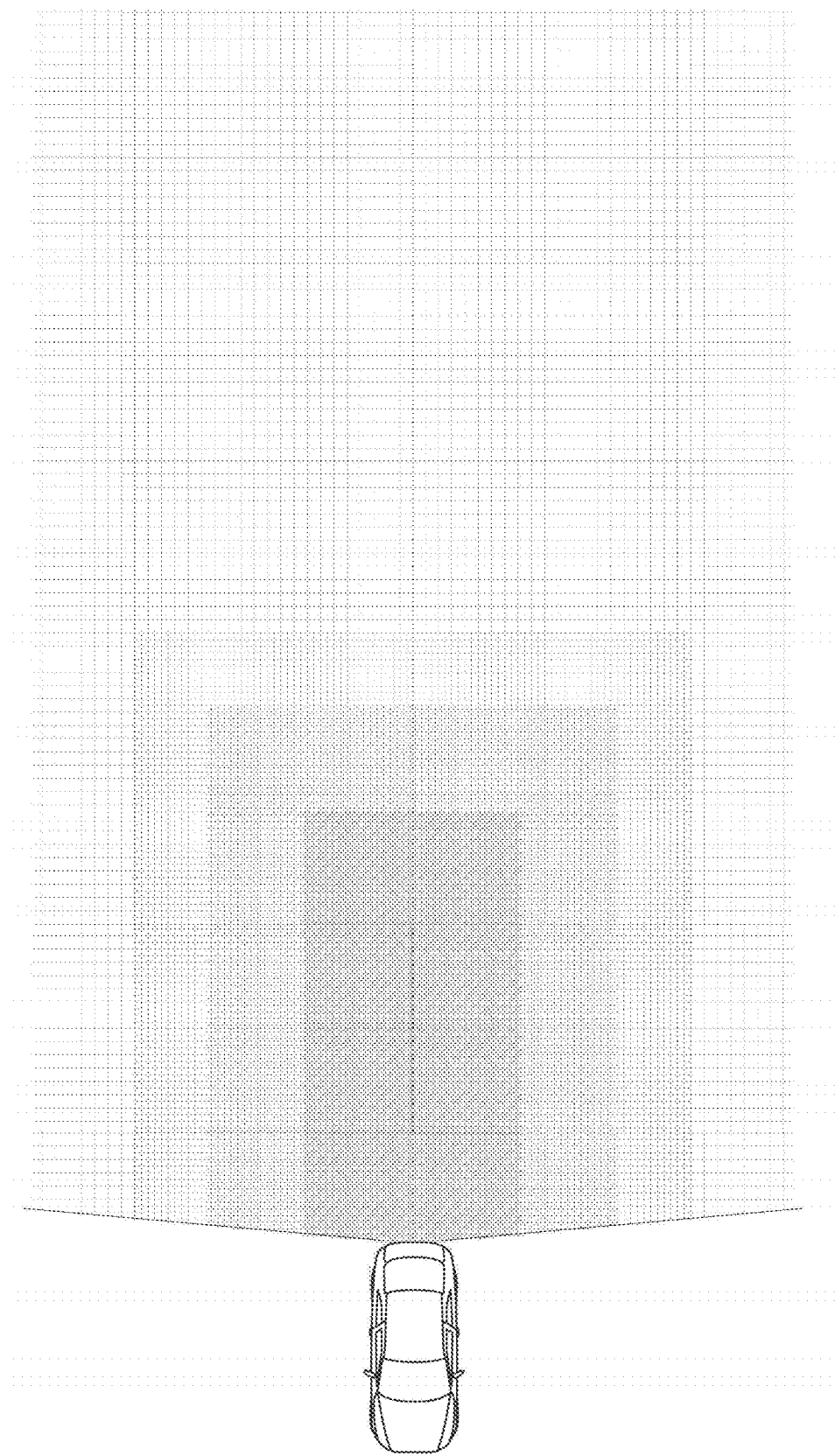
FIG. 22 shows the memory map of a vehicle's rear camera sensor, where each square may equate to a master map grid cell, and when the vehicle may drive forwardly, by that the most distant (known) cells are also the oldest, and with increasing distance, the cells resolution may be diminished by merging four cell contents into one (and by that reducing the memory contest used by that area)
Figure 23:
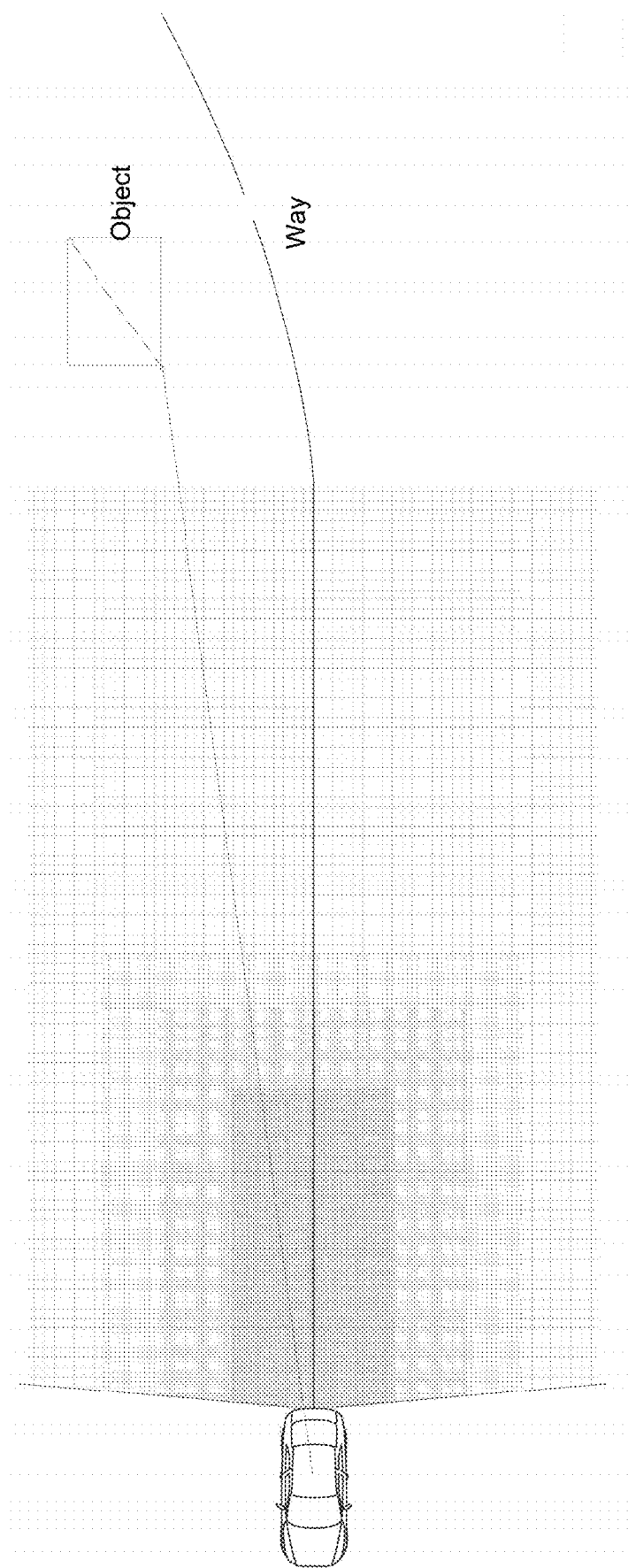
FIG. 23 shows the memory map of a vehicles rear camera sensor similar to FIG. 22, where, at greater distance, the memory map is fully dumped with the exception of objects or positions of interest, and where these position vectors relating to the grid's origin and bounding box extension vector may be held.

Optionally, the system may reduce the map's data resolution increasingly with raising distance and/or age, such as shown in the example of FIG. 22. Optionally, when it comes to dumping map data, the system may keep the above described parking gaps fitted into potential spaces and optionally objects, especially obstacles. These parking lot's (or gap's) data may be reduced to their limiting edges position or position and bounding box extension. Optionally, the system may store the way of travel the vehicle took since the according parking spot was spotted (the relative position vector), such as can be seen with reference to FIG. 23.

Optionally, the system of the present invention, such as at times when a vehicle parking (-in) system detects more than one consecutive parallel parking gaps, may offer (via the vehicle HMI) a more tire gentle parking gap as an option to choose from to the driver, the second best tire gentle parking gap as a second option and so on. Typically, the parking maneuver which requires less strong curving will be the most tire gentle alternative.

Current automated parking systems may change the steering direction when the vehicle is stopped, especially at the end of each stroke. Turning the wheels and tires while the vehicle is not in motion wears the tires a lot. The system of the present invention may reflect this circumstance and will plan or select the parking path to turn the steering as little as possible, particularly when the vehicle is not moving. Thus, the system of the present invention may, when a stroke or path segment approaches its end, the next stroke's entering path direction may be controlled when the vehicle is still in motion (such as, for example, over the last about 20 cm of travel or thereabouts).

When there are more than one consecutive parallel parking gaps, the systems may decide which region is a parking space or gap by dividing the detected space by the number of times the subject vehicle plus some extra space for maneuvering fits into the wide gap. This may happen regardless of the parking gap markings. Optionally, the parking system may always offer the nearest spot to the driver first. Optionally, the system may offer the option to the driver to either choose from parking spots fitted correctly into the markings or to choose from parking spots which fit optimally to the parking space regardless of the markings. Optionally, the system may offer gaps first which may best fit to the manner of parking in that area (optionally influenced locally, cultural, time wise, etc.).

Optionally, the automated parking system of the present invention may have advanced capabilities to enter parallel parking gaps which expand over a curb, whether the curb parking is marked or predetermined by the manner of vehicles parking in that area already or given by law. When maneuvering backward without special regard that there is a curb, the vehicle's rear tire may hit the curb in a sharp angle which may either damage the rim or the tire flange. A human driver naturally would try to avoid that by entering the parking gap in a different manner. A human driver would try to hit the curb at an obtuse angle and then try to turn his vehicle straight afterwards. This may require additional strokes. An automated system may have an alternative mode or setting for the path planning when it comes to entering parking gaps with a curb in it. It may take the curb into account by the restriction that the according tire crossing it must be under a certain angle. The path should be chosen in a way that the number of times both tires in common have to cross the curb should be chosen minimal. Another restriction may be that the tires should rest at full extend at the sidewalk or curb, not hanging over partially. This is for avoiding long term tire damage.

Optionally, the system of the present invention may take additional vehicle inherent sensors into account (which may have a take rate of about 100 percent) when it comes to the task of crossing or hitting curbs. Vehicles are often equipped with barometric tire pressure sensors, typically incorporated at the rim or plug which is connected via radio transmission to an associated vehicle control device. The pressure may be measurable close to real time (when taking away eventually dampening algorithm (with time constants of around 0.5 seconds) which may be in use for supervising the tire pressure for alarming when the tire turns flat or overinflates). Alternatively, sensors at the suspension dampers may sense the immersion depths and/or speed of the dampers. This signal and/or the tire pressure signal may be used as another input to the automated parking system for sensing when the curb is actually hit or entered since the curb may be not always be in view of the camera or cameras and the lateral movement sensors such as wheel tics and GPS may be to imprecise.

Optionally, the automated parking system of the present invention may use four independent vehicle cameras such as cameras from surround view systems with fish eye lens optics (such as shown in FIGS. 6-12). Optionally, the automated parking system may use side cameras with high distortion lens optics which have imagers which center is installed off center the optical center of the optics additionally or alternatively, such as described in International Publication No. WO 2014/204794, which is hereby incorporated herein by reference in its entirety. Such cameras have a good image quality in the blind spot area of the vehicle which is substantially orthogonal sideward and rearward of the B-Pillar of passenger cars.

Figure 2:
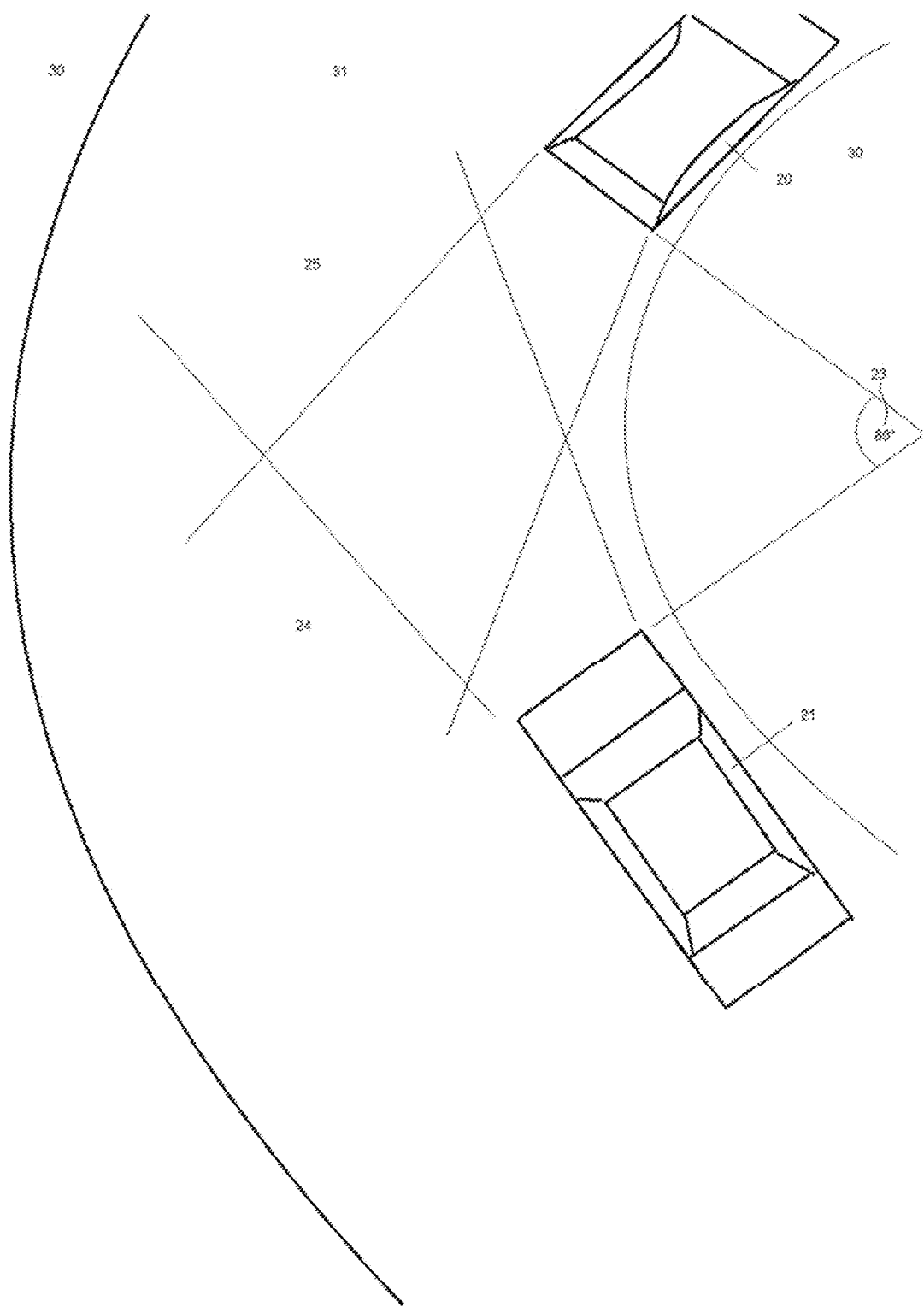
FIG. 2 is a schematic of vehicles parked along a curved road.
Figure 3:
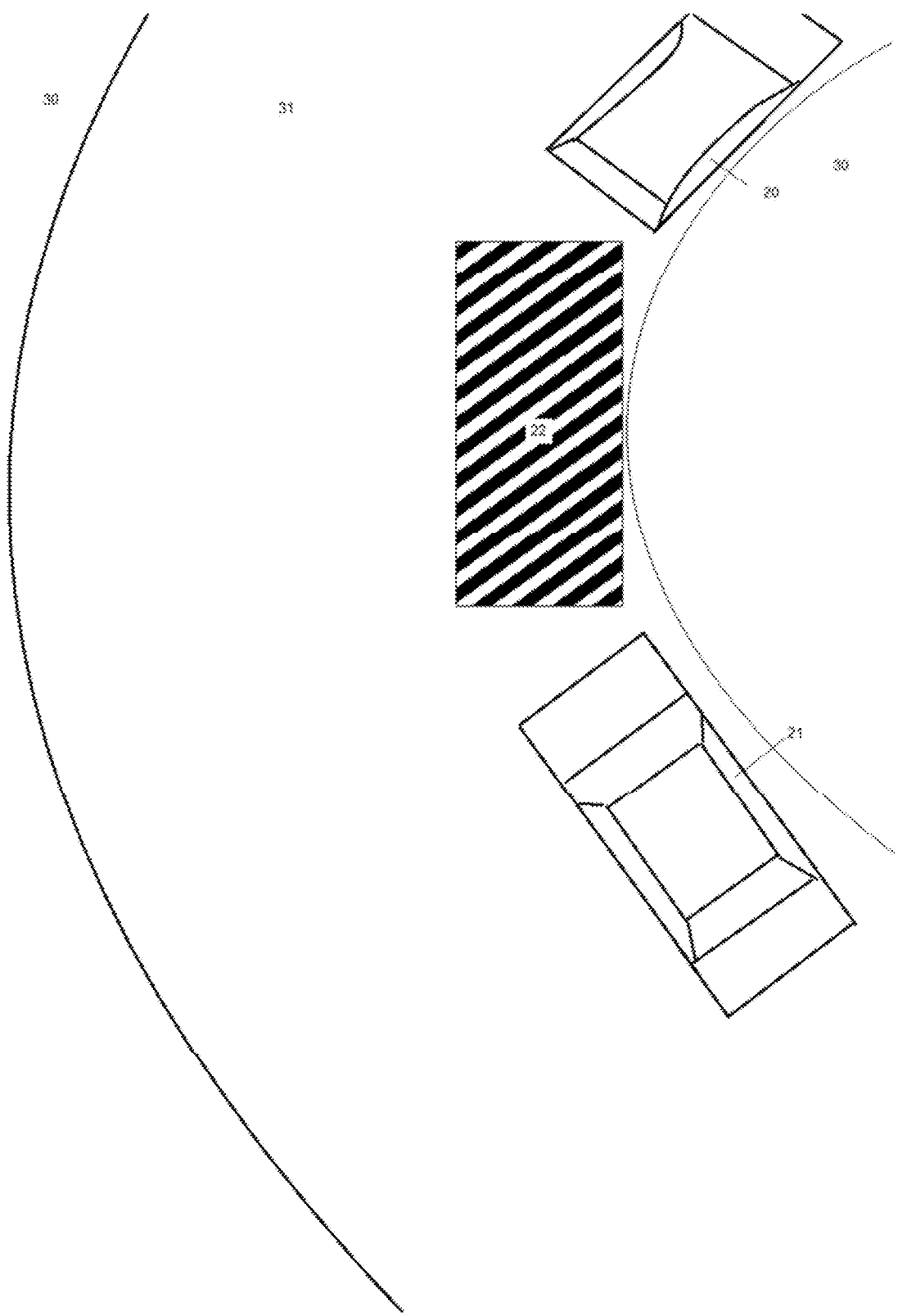
FIG. 3 is another schematic of the vehicles and curved road of FIG. 2, showing a potential parking space between the parked vehicles.
Figure 4:
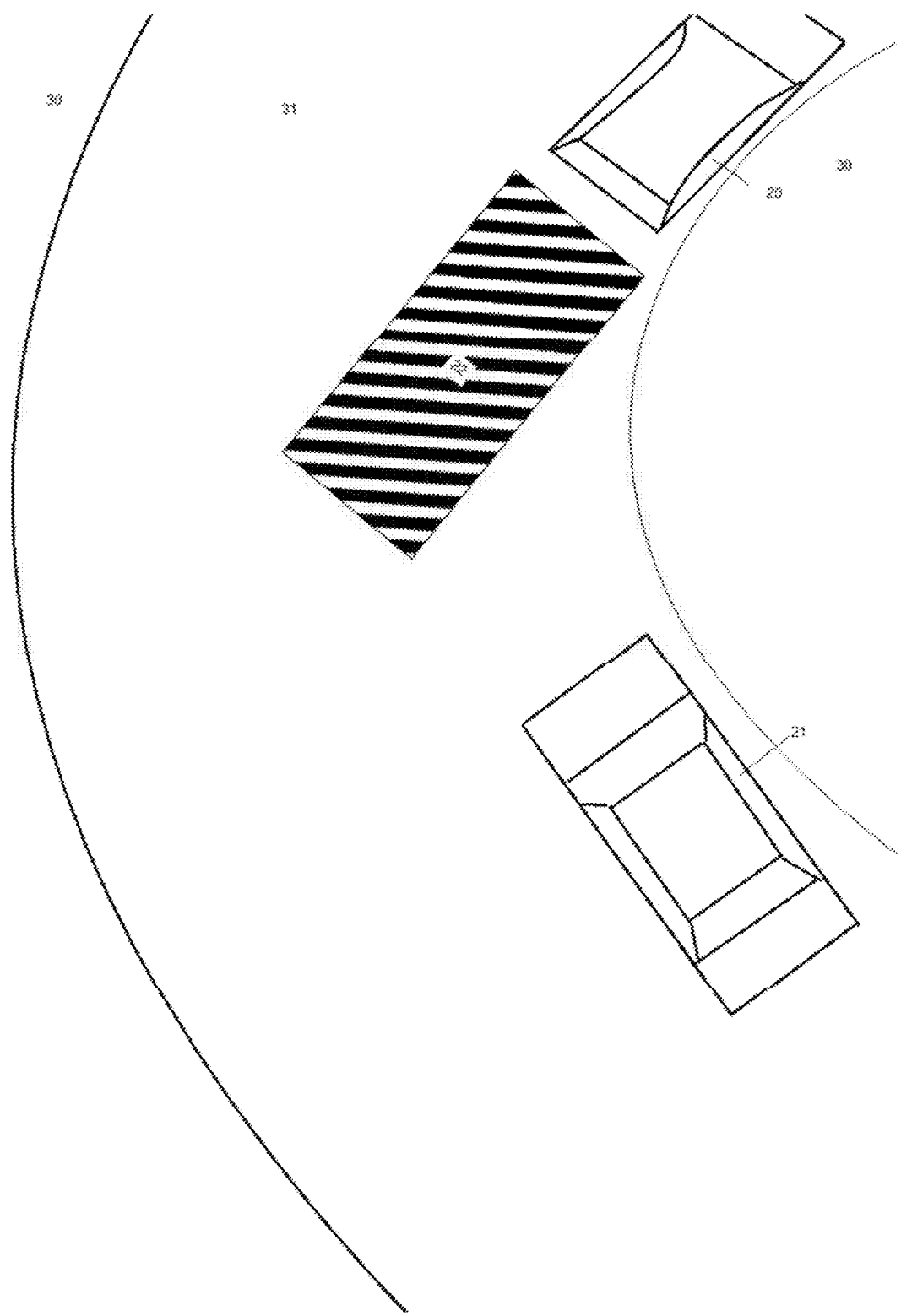
FIG. 4 is another schematic of the vehicles and curved road of FIG. 2, showing an incorrect "parking space" determined by the orientation of the forward parked vehicle.
Figure 5:
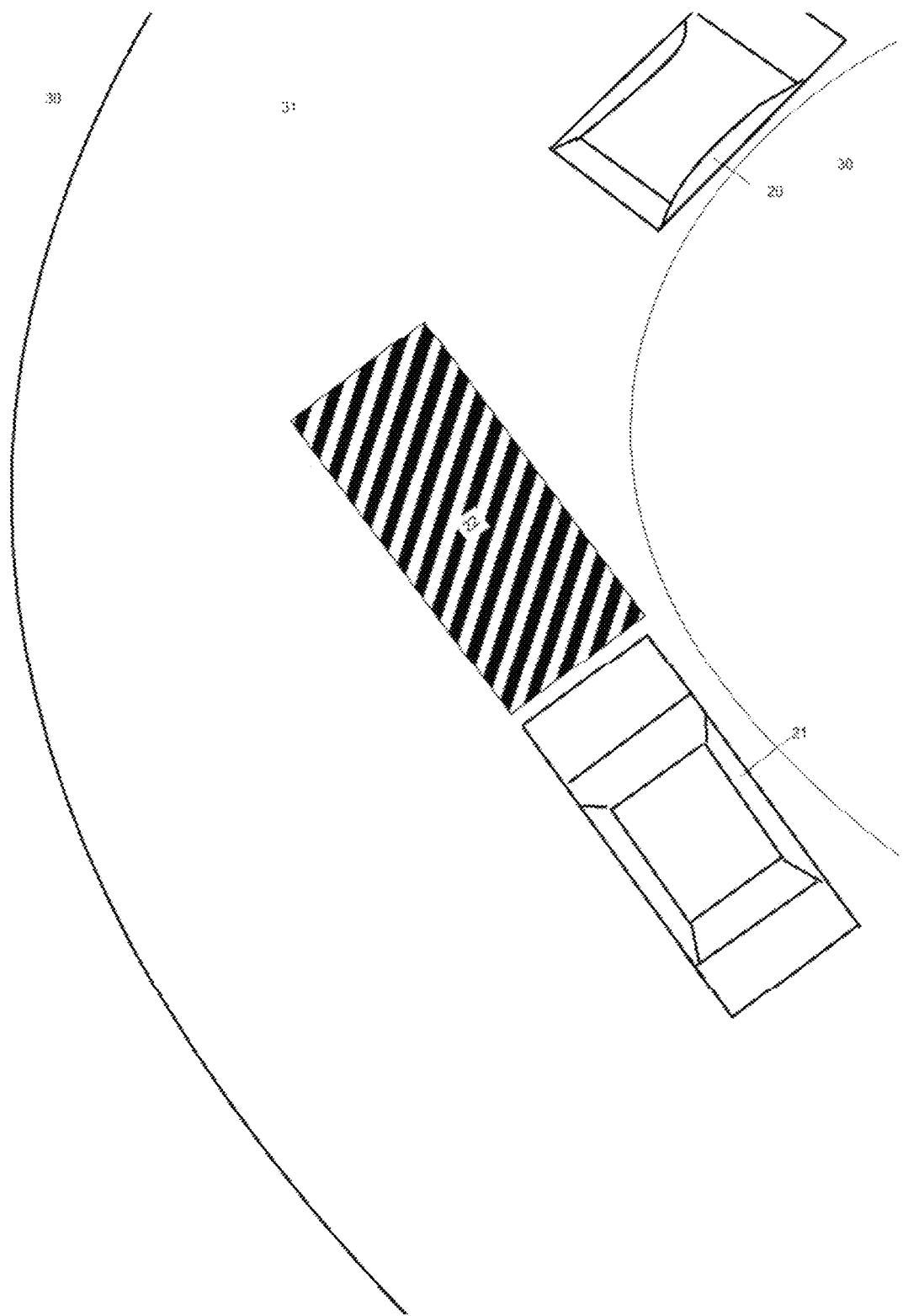
FIG. 5 is another schematic of the vehicles and curved road of FIG. 2, showing an incorrect "parking space" determined by the orientation of the rearward parked vehicle.
Figures 6, 7:
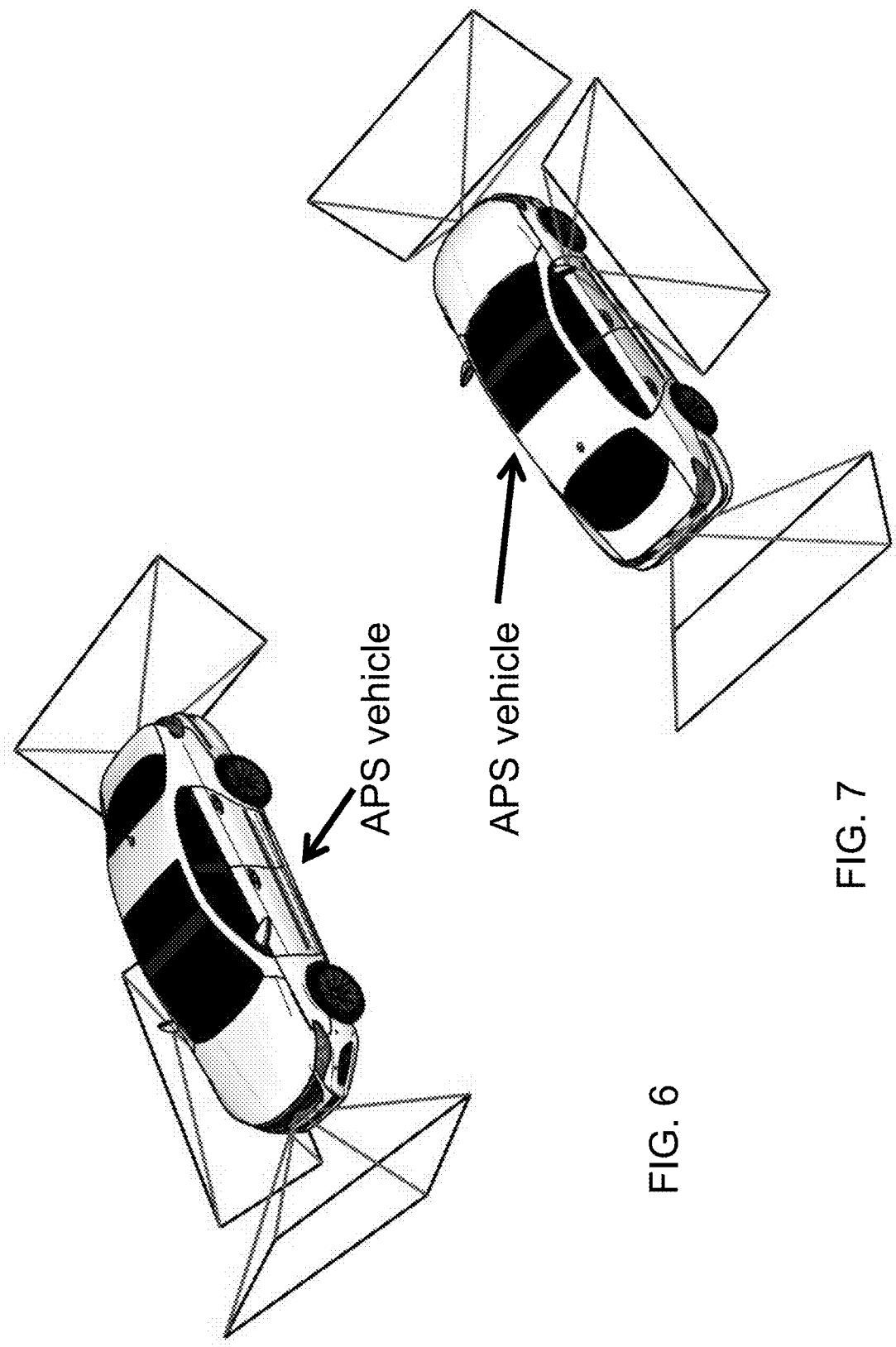
FIGS. 6 and 7 are perspective views of a vehicle equipped with forward, rearward and sideward viewing cameras for use in determining a parking space and/or parking the vehicle in a determined parking space.
Figure 8:
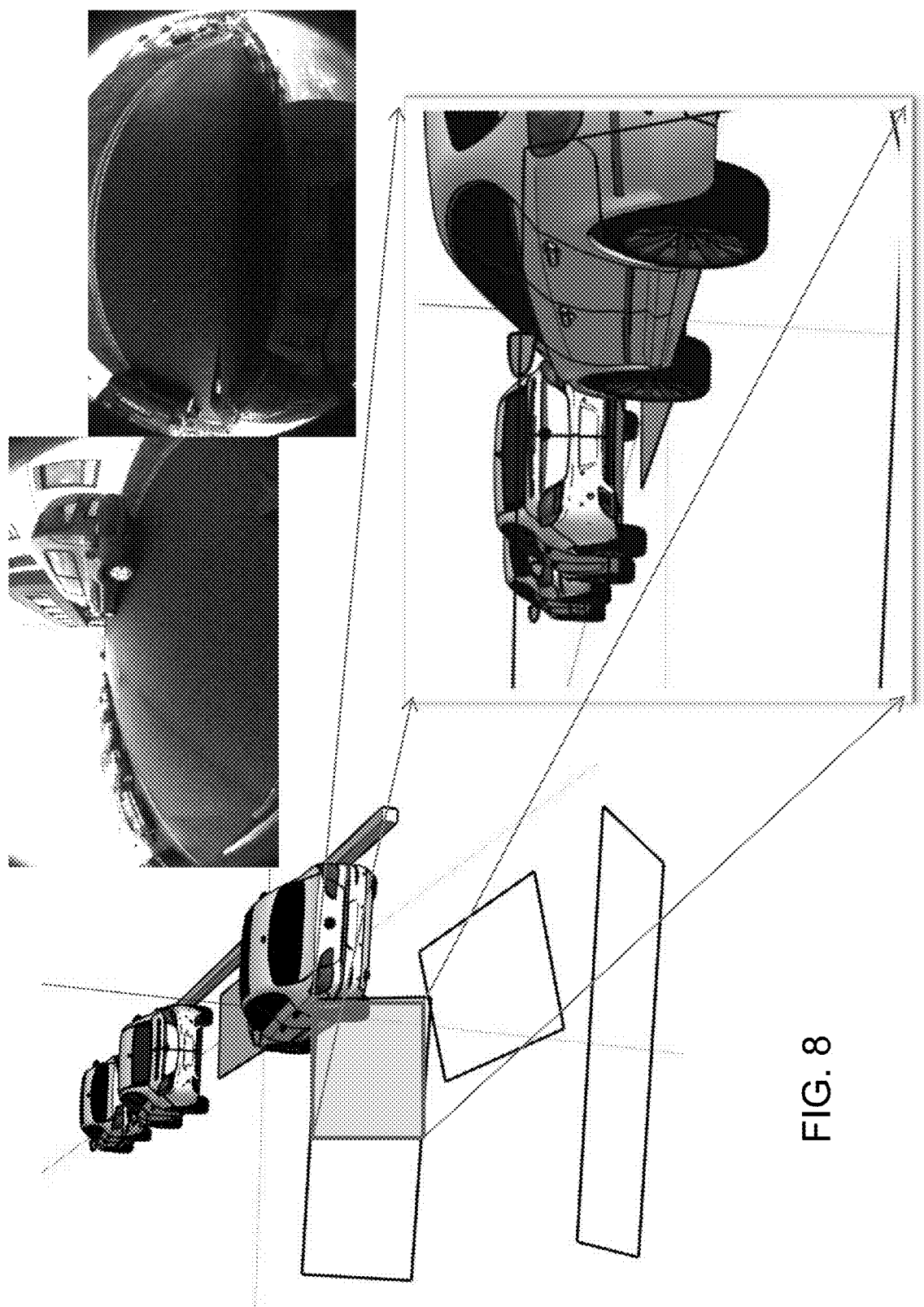
FIGS. 8-12 are schematics and images showing how a subject vehicle may determine a parking space for parking the vehicle into.
Figure 9:
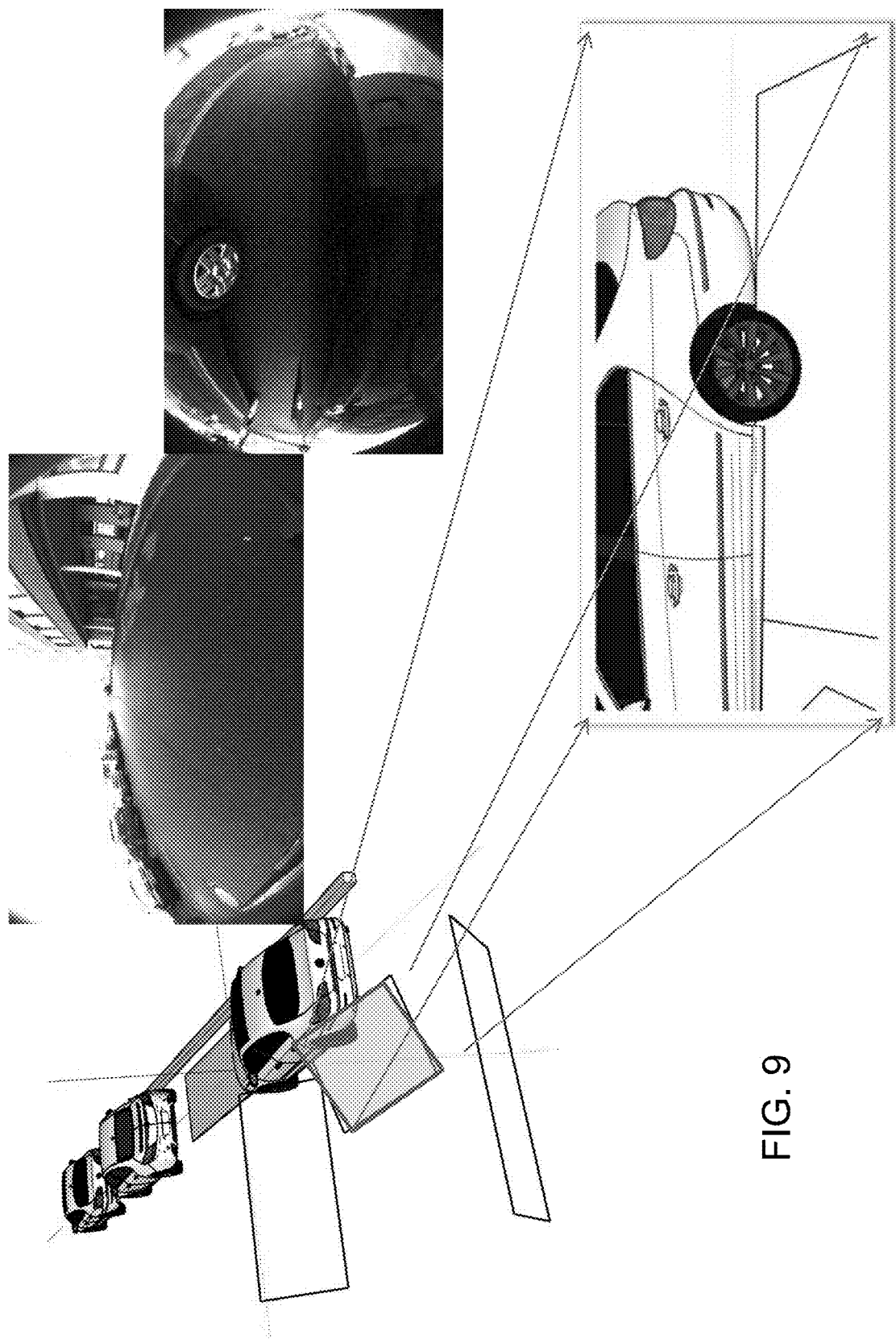
Figure 10:
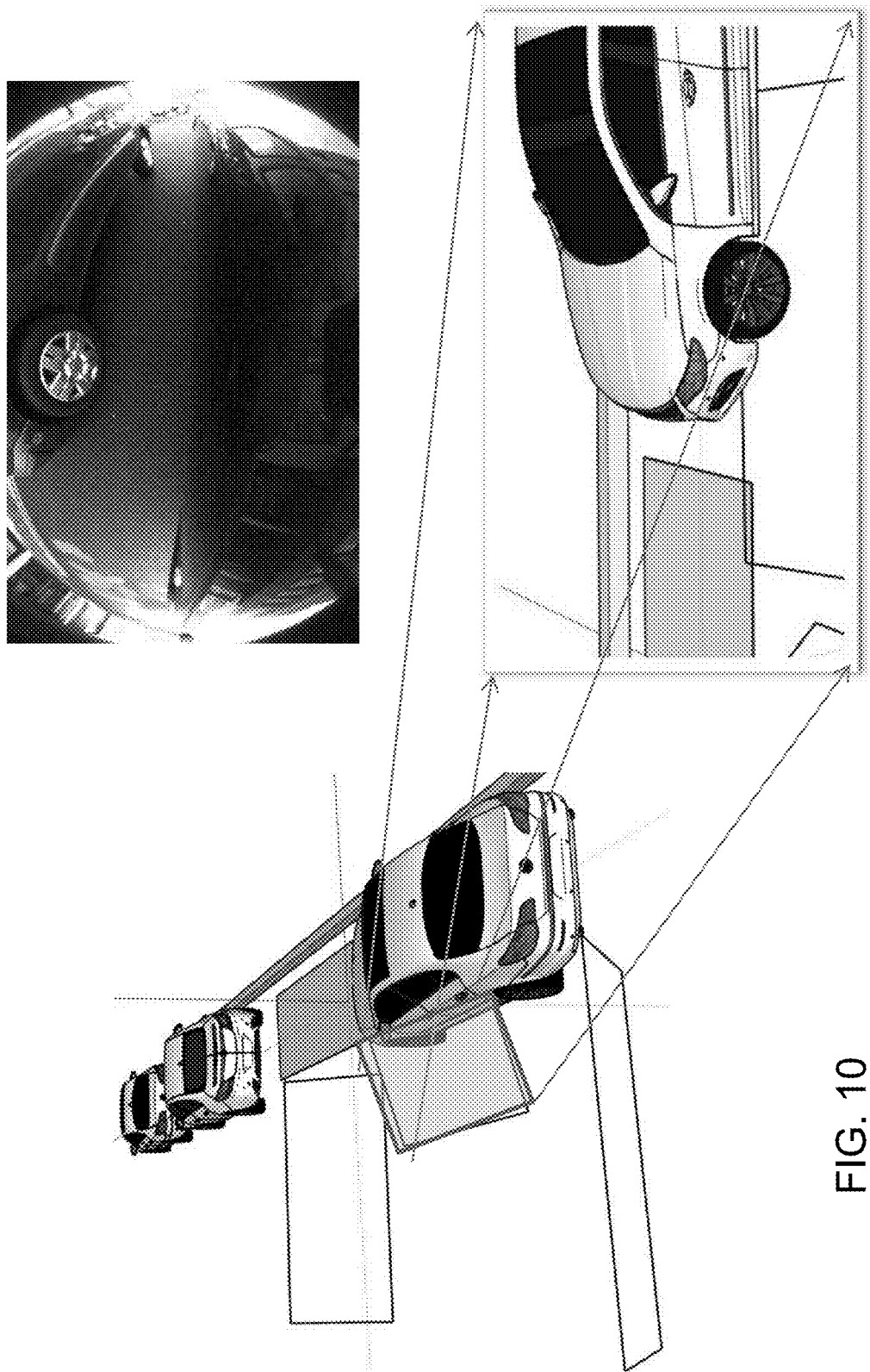
Figure 11:
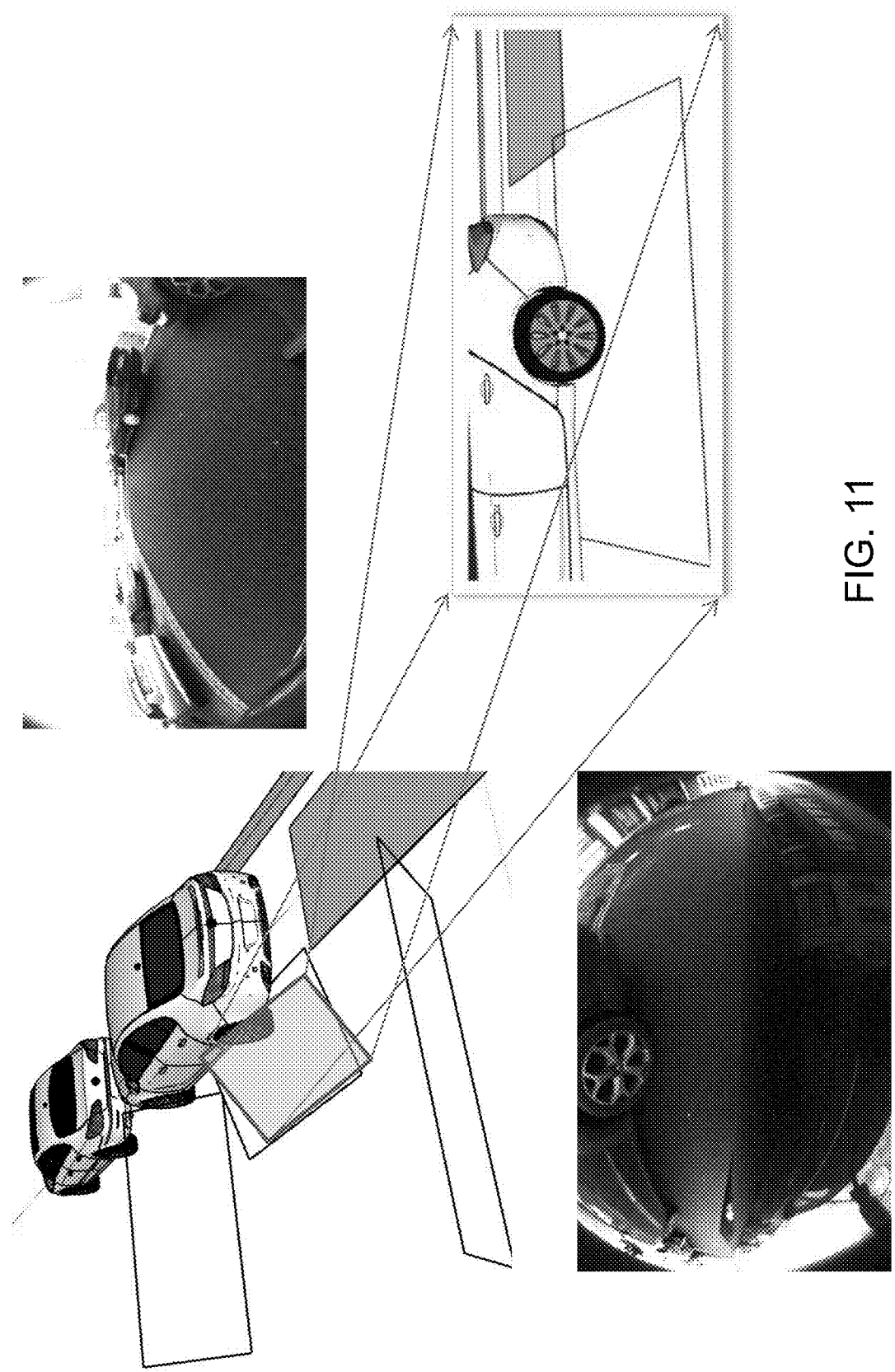
Figure 12:
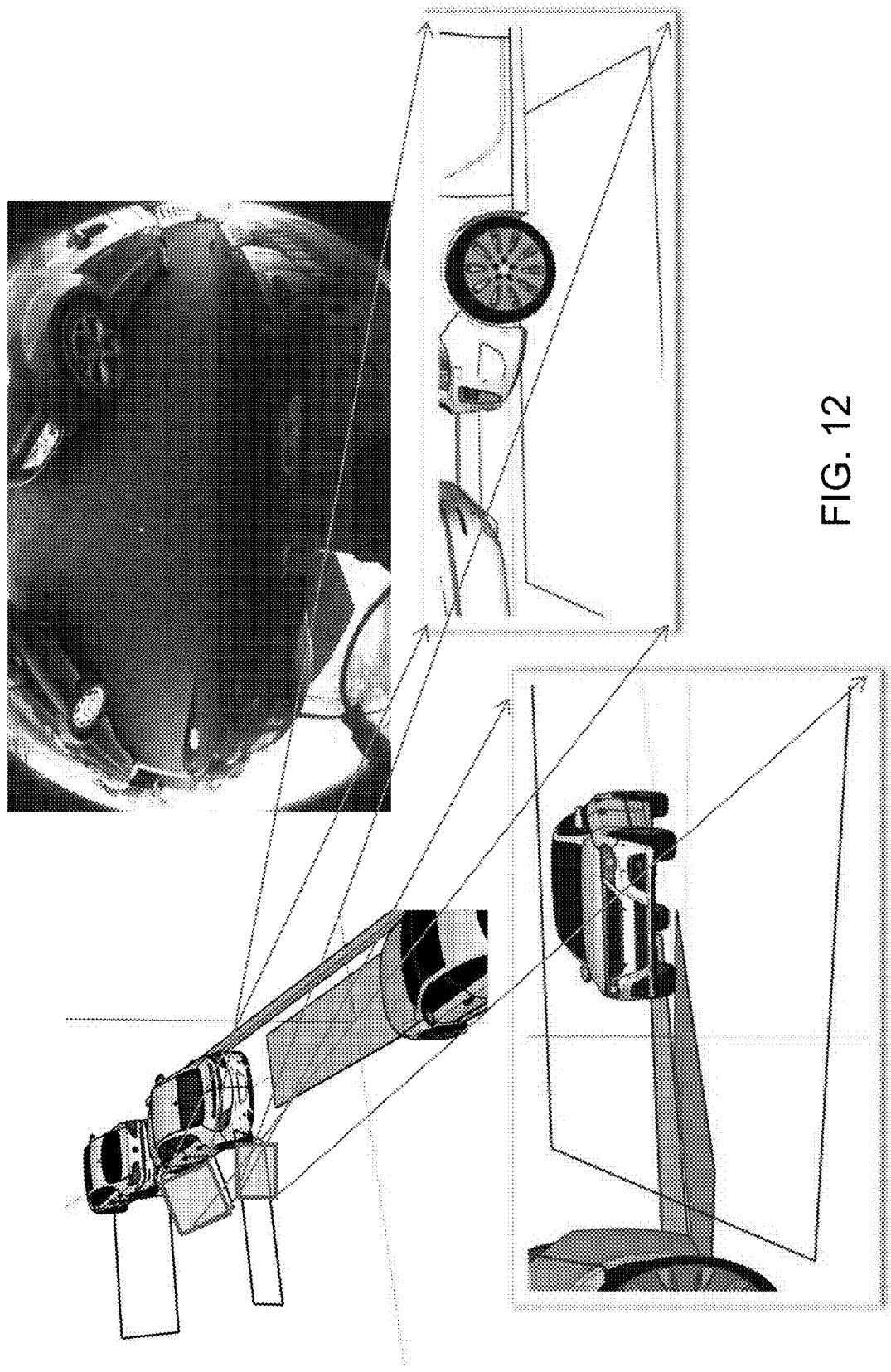
Figure 13:
FIGS. 13-16 are images captured by a camera of a vehicle, showing how the parked vehicles are detected and showing how the tires or wheels of parked vehicles are readily determinable by the vehicle vision system.
Figure 14:
Figure 15:
Figure 16:

Automated parking systems typically have the task to search for suitable parking spots, possibly in a kind of search mode, before entering an automated or semi-automated parking (in) mode. An advanced requirement to the parking gap search is to also detect parking gaps correctly when the road curves. As sharper a curve is, the more complicated it is for the system to correctly understand the scenes parking 'scheme'. An example of such a scene is shown in FIGS. 2 and 3. In a right hand curve with vehicles parking on the right (in a country with right hand traffic), the tail of a vehicle 20 parking in a parking spot ahead and the front of a vehicle 21 parking in a parking spot behind a free parking gap 22 may not stand face to face any more. The curvature angle may be that high that front and tail of both show a substantial angle 23 (such as, for example, about 80 degrees). Just projecting the tail area 24 of the leading vehicle 20 straight behind the vehicle parking in front of a potential parking gap 24 or projecting into an area 25 straight ahead of a vehicle 21 parked behind of a potential parking gap does not deliver the correct space and orientation (such as shown in FIG. 3) of a potential parking spot 22 (or parking box). FIG. 4 shows a wrong orientation of a parking box, orientated by the rear space of the vehicle in front of a potential parking gap, and FIG. 5 shows a wrong orientation of a parking box, orientated by the space in front of the vehicle parked in the rear of a potential parking gap.

Optionally, the automated parking system of the present invention may be capable of understanding or taking into account parking schemes or contexts of curved road's parking gap scenes. This may be achieved by taking the record of the last history of the steering angle into account. Optionally, additionally or alternatively, GPS and road map data may be taken into account. Optionally, additionally or alternatively, remote data provided via any kind of radio transmission may be taken into account (such as by utilizing aspects of the systems described in U.S. Publication Nos. US-2014-0375476 and/or US-2015-0124096 and/or U.S. patent application Ser. No. 14/636,503, filed Mar. 3, 2015 and published Sep. 10, 2015 as U.S. Publication No. US-2015-0251599, Ser. No. 14/561,794, filed Dec. 5, 2014 and published Jun. 11, 2015 as U.S. Publication No. US-2015-0158499, which are all hereby incorporated herein by reference in their entireties.

Optionally, and such as can be seen with reference to FIGS. 13-16, the system may utilize the fact that parked vehicle's tires are well discriminatable objects of expectable size and orientation when vehicles are parked in parallel. When a scene is hard to detect due to low visibility or structural noise or overexposure, the tires may serve as clear starting and ending marks of a parking gap. When two consecutive tires may have a distance of a typical axle distance of a vehicle (such as, for example, about three meters) there is the indication that there is no parking gap. When the distance between determined consecutive tires is at, for example, greater than about ten meters, there may be the indication that there may be a potential parking gap. The gap may be double checked by using further different methods such as classification algorithm (checking whether the area of the potential parking gap seems to have a drivable surface) or distance estimation algorithm (checking whether the rearward sideward expected open space matches with the prior detection). When the road and with it the parking gaps describe curves, the orientation of the tires may be used as indication of curvature of the road and may be used to set the left borderline of a fitted parking (box 22 in FIG. 4) and its orientation. When fitting a spline curve through the surface of an oval fitted to the closest tire of the vehicle 20 ahead of a potential parking gap 22 and fitting it through the surface of an oval fitted to the closest tire of the vehicle 24 behind a potential parking gap 22, the orientation of the tangential in the middle of both along the spline is the possibly best orientation of the parking box.

Optionally, a parking assist system or automatic parking system may alert the driver of a door clearance for opening the vehicle door or doors when the vehicle is parked in a parking space. The system may provide an alert of tight clearance before the vehicle is parked in a space so that the driver may decide whether or not to park in the potentially tight space.

Figure 17:
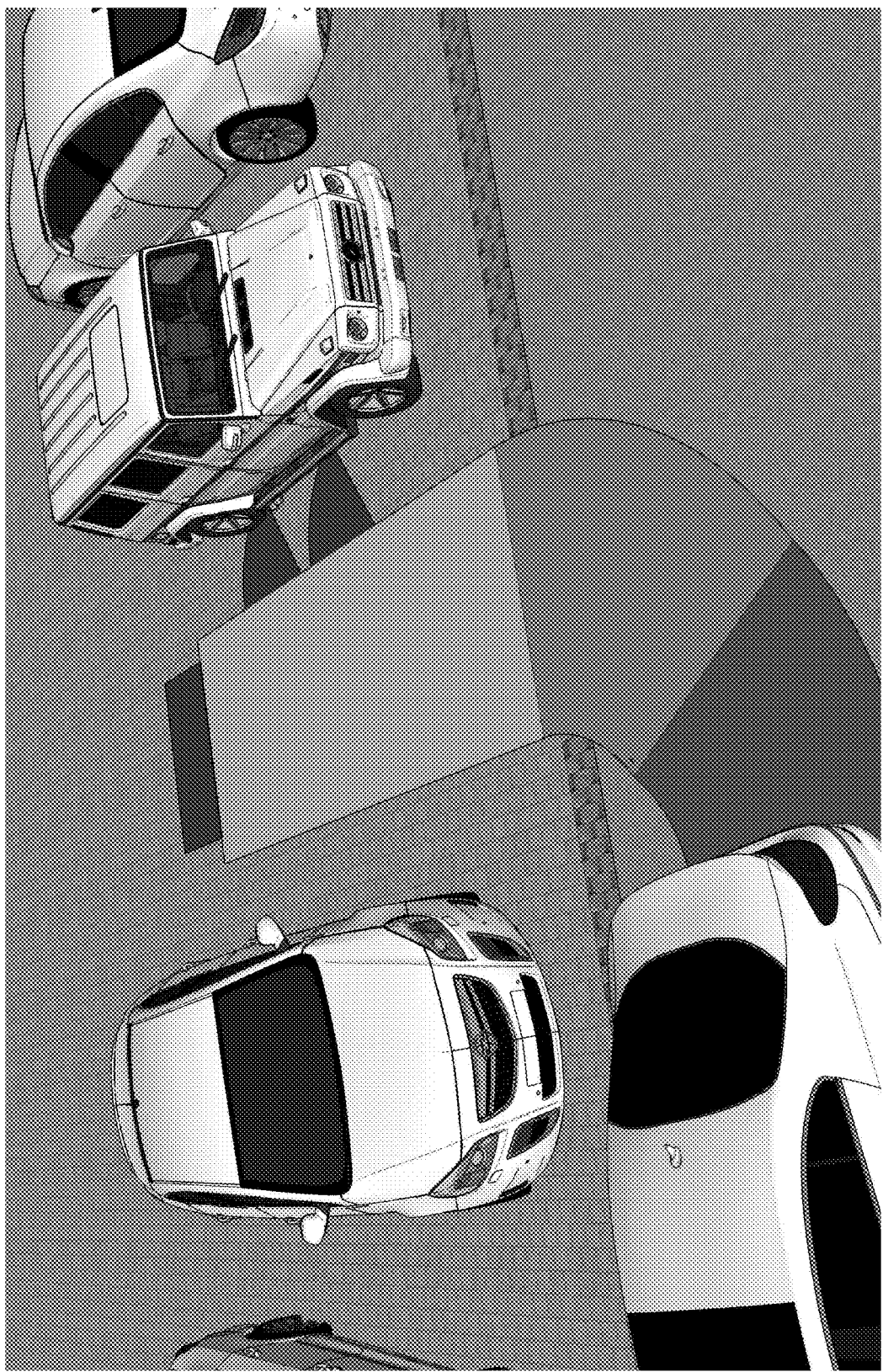
FIGS. 17 and 18 are perspective views of a vehicle entering a parking space and showing the amount of clearance for the doors of the vehicle to open when the vehicle is parked in the parking space.
Figure 18:
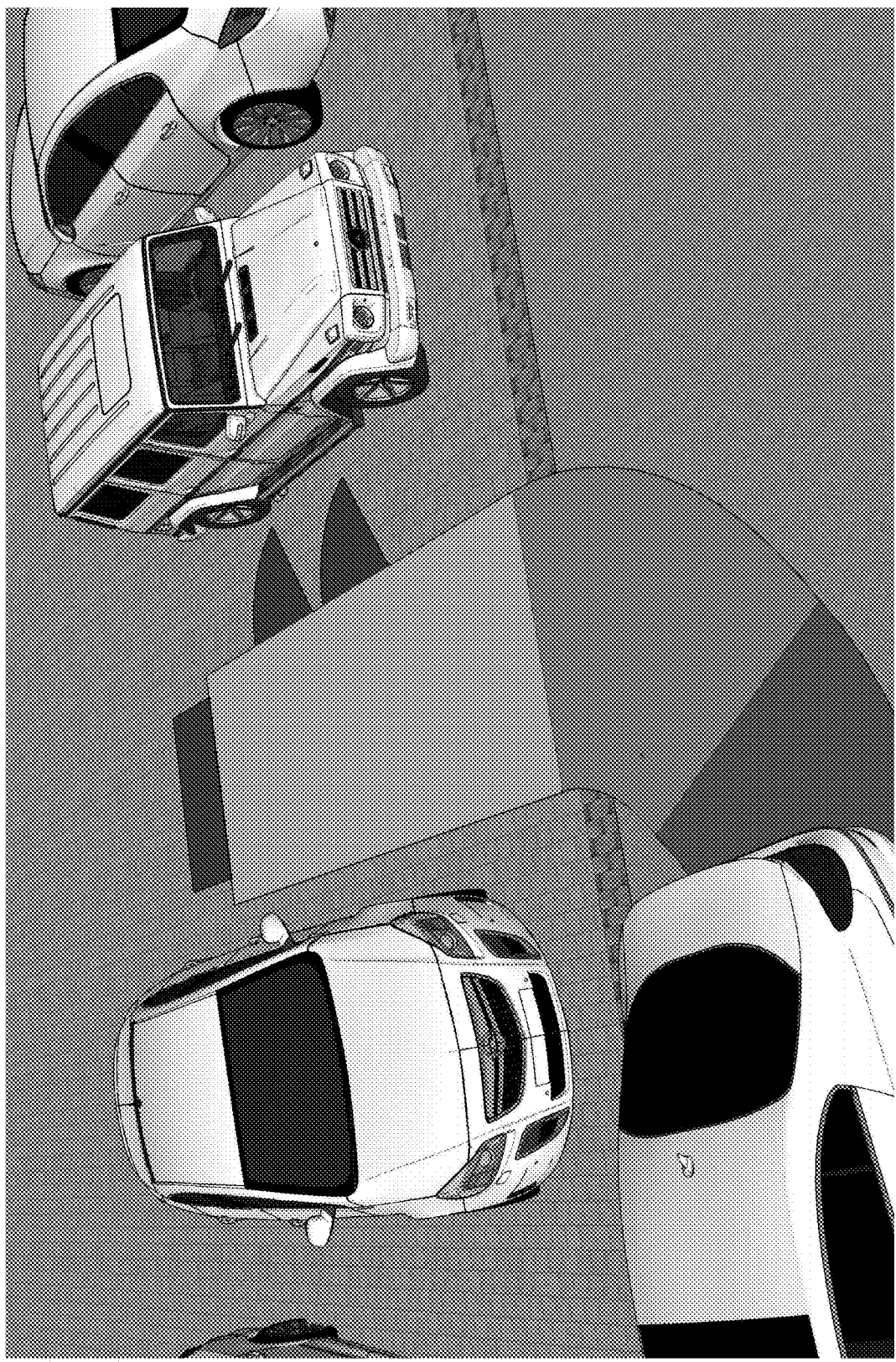

When a parking situation is tight or vehicles are shifted over or close to the parking markings, a vehicle can still park usually in the middle of the parking space. However, in some situations, that may result in the parked vehicle being very close to the vehicle at one side of the parking space, such as in a perpendicular parking space (such as shown in FIGS. 17 and 18). If the space is too tight, this may limit or prevent fully opening the door, which may make it difficult or impossible for the driver to step in and out of the parked vehicle. Therefore, if a parking space is too tight and the vehicle is automatically parked in such a parking space, the driver may have to pull the automatic parked vehicle out and park off-center (such as shown in FIG. 18) or may have to continue searching another parking space.

The parking system of the present invention may provide (prior to the system automatically parking the vehicle at a potentially tight or narrow parking space) information relative to the estimated driver door opening status or clearance that will occur if the vehicle is parked at the found parking space. The driver, upon receipt of the information, can then decide to cancel the parking procedure or to modify the parking procedure (further left or right, such as shown in FIG. 18) to generate the desired driver door opening clearance. Also the system may provide a preferred driver door opening minimum clearance, such as may be selected or input by the driver or as may be related to the vehicle type or model, with the minimum clearance stored and used by the system to determine if a particular parking space is suitable for automatic parking of the vehicle therein. Optionally, the door opening mechanical behavior may be provided by OEM CAD data and can be modeled to compared with the estimated parking position and remaining space between the parking vehicle's body and other vehicle body or object at or adjacent to the targeted parking space. Optionally, the environmental scene understanding and automated parking system may detect the orientation of the parked vehicle next to the parking spot subject to park at. The system may preferably offer to park the passenger door closely next to another vehicle's passenger door so as to avoid blocking neighborly parked vehicles driver doors, for easing these vehicles drivers to enter their vehicle easy by themselves for avoiding accidently or violently occurred vehicle damages.

The system thus may provide information to the driver of the automatically parking vehicle so that the driver can make an informed decision as to whether or not to park the vehicle at the particular parking space and whether or not to adjust the parking location within the parking space (to the left or right, front or tail first). For example, if a driver of a vehicle is informed that parking of the vehicle at the center of a parking space (such as shown in FIG. 17), the driver may elect to shift the parking location towards the passenger side (such as shown in FIG. 18), but if there are passengers in the vehicle, the driver may elect to not park in that parking space and to continue searching for a suitable or large enough parking space for the vehicle. The information may be provided as a schematic or display or otherwise communicated to the driver so that the driver is aware of any clearance issues with a parking space before the vehicle is parked in the parking space.

As another option, the system of the present invention may be able to not just park a vehicle into a parking lot, but also to park it out or drive out of a parking spot, such as in a minimal sources approach of a parking out system that is achieved by using just one rear camera (and no ultrasound sensors) with a special driver interaction. However, the below described algorithms and functions may also apply to systems that may optionally include more than one (outside) vehicle camera (such as a four camera surround view system or ultrasound sensors). In some situations where a vehicle is parked in a dense or tight parking spot (having little clearance forward and/or rearward of the vehicle), the driver may not want to park out but may prefer to have the system pull the vehicle out of the parking spot. The driver may start the vehicle, and optionally, when required, start the parking out automated system, and then may drive the vehicle forward (fully driver controlled) until the driver thinks the vehicle is close to the vehicle or parking gaps end in front. Optionally, the vehicle may have a car2x (or vehicle2x or V2X) connection to determine the gap between the vehicles. Optionally, the parking system may provide a vehicle control by smartphone. For a better view, the driver may stand aside the vehicle watching the gap to the vehicle in front of the subject vehicle close, and stopping movement of the subject vehicle before contacting the other parked vehicle. After that and after optional HMI confirmation, the vehicle may start to maneuver out of the parking gap autonomously, starting with reversing. The rear end of the parking lot (or parking gap) may be determined by rear camera image computing. The forward end of the parking lot (or parking gap) may be virtually limited by the spot where the driver stopped his vehicle at the first forward stroke (driver controlled). During the parking out maneuver, the driver may stay in control to stop the vehicle all time (such as typically required by law nowadays). The vehicle may move in reverse and move forward as efficient as possible, without violating the virtual forward limit of the parking gap and also not violating the space at the sidewalk side of the (opposite to the street side) for not damaging the vehicle's rims and/or the fenders and not harming pedestrians (when the vehicle is exiting a parking gap with standing with four or two wheels on the sidewalk or curb, the sidewalk borderline may be the sideward limit). The vehicle may continue in several strokes or passes when necessary (the more dense the parking gap, the more strokes may be necessary to maneuver out) until the vehicle stands in a position to comfortably enter the street traffic. That position may be parallel to the original parking spot or facing outbound with the vehicle's front. At that time the parking out automation may disengage and may stop the vehicle, whereby the driver may then take over full control of the vehicle.

Optionally, in case the vehicle is not equipped with a rear camera nor any other camera or ultrasound or RADAR or LIDAR sensor, the system may still be able to provide a semi-automated parking out assistant system. Not just the own parking gaps in front may be set by the farthest point the driver is maneuvering the vehicle to, but also the farthest rear end may be set by the driver. To do that, the driver may drive first forward, and stop when close to the vehicle in front of the parked subject vehicle, and then may drive in reverse or rearward and stop when close to the vehicle behind the parked subject vehicle (both maneuvers fully driver controlled). The forward and rearward end of the parking space may be defined by the furthest points of travel of the subject vehicle in the forward and reverse directions. After that is known (to the vehicle, such as by tracking wheel rotations or the like of the subject vehicle), the vehicle may start to park out into a direction (left or right hand side) entered by HMI. As with the system described above, the vehicle may not violate the limits of the (virtual) parking gap box defined by the vehicle side of the side walk, the stop point in front and the stop point at the rear. Also, and as discussed above, the driver may stay in control of all consecutive parking out maneuvers for preventing vehicle damage and hazards to pedestrians. Also, and as discussed above, the further parking out maneuver may be controlled remotely via smartphone HMI while the driver may step out his car and watch the scene.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EYEQ2 or EYEQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/123161; WO 2013/126715; WO 2013/043661; WO 2013/158592 and/or WO 2014/204794, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Publication No. US-2012-0062743, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985 and/or WO 2013/086249, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular automated parking system, the vehicular automated parking system comprising:

a plurality of cameras disposed at a vehicle equipped with the vehicular automated parking system;

wherein the plurality of cameras comprises (i) a front camera disposed at a front portion of the equipped vehicle and viewing at least forward of the equipped vehicle, (ii) a rear camera disposed at a rear portion of the equipped vehicle and viewing at least rearward of the equipped vehicle, (iii) a driver-side camera disposed at a driver side of the equipped vehicle and viewing at least sideward of the equipped vehicle and (iv) a passenger-side camera disposed at a passenger side of the equipped vehicle and viewing at least sideward of the equipped vehicle;

wherein each camera of the plurality of cameras comprises an imaging array having at least one million photosensors arranged in rows and columns;

an electronic control unit (ECU) comprising an image processor operable to process image data captured by individual cameras of the plurality of cameras;

a video display screen disposed in the equipped vehicle and viewable by a driver of the equipped vehicle as the equipped vehicle travels along a road;

wherein, while the equipped vehicle is traveling along the road, the vehicular automated parking system operates in a parking space locating mode to determine available parking spaces;

wherein, while the equipped vehicle is traveling along the road, the vehicular automated parking system, when operating in the parking space locating mode, determines available parking spaces at least in part via processing at the ECU of image data captured by at least one camera of the plurality of cameras;

wherein the vehicular automated parking system fuses a plurality of the determined available parking spaces with pre-existing road map data to generate an annotated map for display at the video display screen for viewing by the driver of the equipped vehicle to assist the driver in selecting a parking space from the plurality of determined available parking spaces, and wherein the annotated map displays the plurality of the determined available parking spaces relative to features from the pre-existing road map data; and wherein, after selection of the parking space, the vehicular automated parking system parks the equipped vehicle in the selected parking space.

2. The vehicular automated parking system of claim 1, wherein, responsive to a tire pressure sensor of the equipped vehicle, the vehicular automated parking system determines when a tire of the equipped vehicle contacts a curb.

3. The vehicular automated parking system of claim 1, wherein, responsive to a suspension sensor of the equipped vehicle, the vehicular automated parking system determines when a tire of the equipped vehicle contacts a curb.

4. The vehicular automated parking system of claim 1, wherein the vehicular automated parking system determines the selected parking space at least in part responsive to determination, via processing by the image processor of image data captured by the at least one camera of the plurality of cameras, of tires of parked vehicles along the road and a sufficient size gap between determined tires of parked vehicles.

5. The vehicular automated parking system of claim 1, wherein, after the equipped vehicle is parked in the selected parking space, the vehicular automated parking system is operable to control the equipped vehicle to leave the selected parking space responsive at least in part to actuation of a user input.

6. The vehicular automated parking system of claim 5, wherein, responsive at least in part to actuation of the user input, the vehicular automated parking system controls the equipped vehicle to leave the selected parking space in a manner that avoids contacting a curb along one side of the selected parking space.

7. The vehicular automated parking system of claim 1, wherein each camera of the plurality of cameras comprises a color video camera.

* * * * *